United States Patent
Hassan et al.

(10) Patent No.: US 11,563,628 B1
(45) Date of Patent: Jan. 24, 2023

(54) FAILURE DETECTION IN CLOUD-COMPUTING SYSTEMS

(71) Applicant: Oracle International Corporation, Redwood Shores, CA (US)

(72) Inventors: Mohamed Saber Abdelfattah Hassan, Sammamish, WA (US); Jonathan Jorge Nadal, Seattle, WA (US); Iliya Roitburg, Seattle, WA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 17/409,679

(22) Filed: Aug. 23, 2021

(51) Int. Cl.
*H04L 41/0686* (2022.01)
*H04L 43/0852* (2022.01)

(52) U.S. Cl.
CPC ...... *H04L 41/0686* (2013.01); *H04L 43/0852* (2013.01)

(58) Field of Classification Search
CPC .................. H04L 41/0686; H04L 43/0852
See application file for complete search history.

(56) References Cited

U.S. PATENT DOCUMENTS

| | | | |
|---|---|---|---|
| 8,286,139 B2 | 10/2012 | Jones et al. | |
| 8,782,614 B2 | 7/2014 | Basak et al. | |
| 10,007,562 B2 | 6/2018 | Brichford | |
| 10,924,410 B1* | 2/2021 | Nee | H04L 47/125 |
| 2015/0227406 A1* | 8/2015 | Jan | G06F 11/0709 714/37 |
| 2016/0182328 A1* | 6/2016 | Bhasin | H04L 43/04 709/224 |
| 2019/0288947 A1* | 9/2019 | Jain | H04L 67/1002 |
| 2020/0242002 A1 | 7/2020 | Otsuki et al. | |
| 2020/0364128 A1* | 11/2020 | Vittal | G06F 11/3055 |
| 2020/0366587 A1* | 11/2020 | White | G06F 11/0709 |

FOREIGN PATENT DOCUMENTS

| | | |
|---|---|---|
| CN | 102419703 A | 4/2012 |
| CN | 110442504 A | 11/2019 |
| CN | 109189469 B | 8/2020 |
| WO | 2021076265 A1 | 4/2021 |

OTHER PUBLICATIONS

"Call Graphs", App Dynamics Documentation 21.x, Accessed from Internet on May 5, 2021, pp. 1-4.

* cited by examiner

*Primary Examiner* — Brian Whipple
*Assistant Examiner* — James Ross Hollister
(74) *Attorney, Agent, or Firm* — Kilpatrick Townsend & Stockton LLP

(57) ABSTRACT

Techniques discussed herein monitoring for and identifying failures in a cloud-computing environment. Proxy devices can be communicatively disposed between services of the cloud-computing environment. The proxy devices can capture call stack data corresponding to function calls between services. A directional graph can be generated based on that call stack data that represents the communication paths between cloud-computing resources (e.g., the services). Ingress paths to a service can be evaluated by calculating various metrics for each path. Using these metrics, failures can be isolated to a particular communication path and/or a particular, and potentially relatively distant, upstream service.

17 Claims, 12 Drawing Sheets

| | Source | Destination | Ingress ID | Egress ID | Created On | Latency | Response Code |
|---|---|---|---|---|---|---|---|
| 1 | Proxy A | Service A | reqID/stackID | reqID/stackID/dsReqID1 | T1 | 10 | 20 |
| 2 | Proxy A | Service B | reqID/stackID | reqID/stackID/dsReqID2 | T2 | 9 | 20 |
| 3 | Proxy A | Data Store C | reqID/stackID | reqID/stackID/dsReqID3 | T3 | 7 | 20 |
| 4 | Proxy A | Service D | reqID/stackID | reqID/stackID/dsReqID4 | T4 | 10 | 40 |
| 5 | Service D | Service E | reqID/stackID | reqID/stackID/dsReqID5 | T5 | 20 | 20 |
| 6 | Service D | Service G | reqID/stackID | reqID/stackID/dsReqID6 | T6 | 10 | 20 |
| 7 | Service E | Service G | reqID/stackID | reqID/stackID/dsReqID7 | T7 | 4 | 20 |
| 8 | Service E | Service F | reqID/stackID | reqID/stackID/dsReqID8 | T8 | 16 | 20 |
| 9 | Service F | Service G | reqID/stackID | reqID/stackID/dsReqID9 | T9 | 19 | 20 |

*FIG. 2*

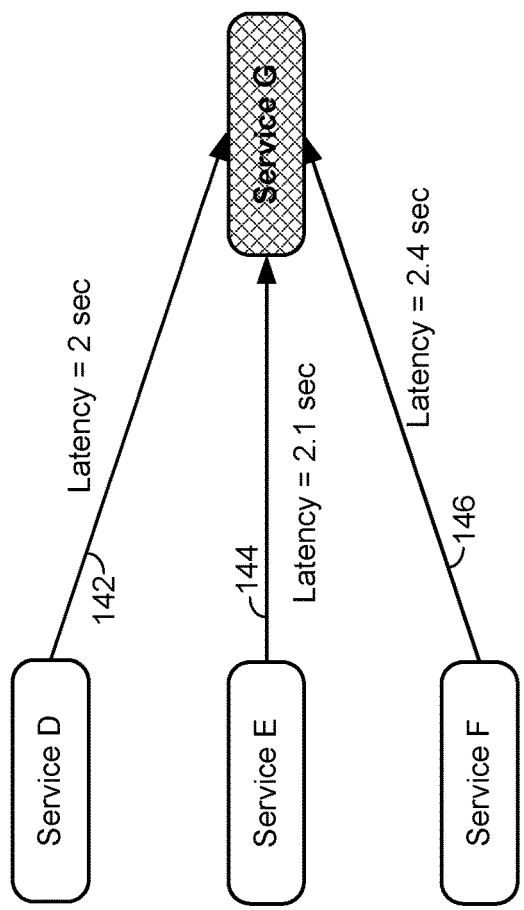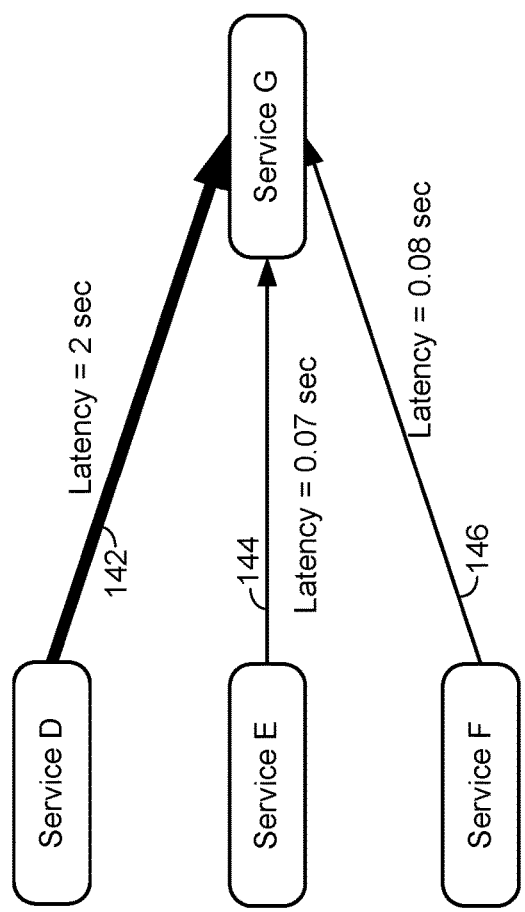
FIG. 5A
FIG. 5B

FAILURE DETECTION IN CLOUD-COMPUTING SYSTEMS

BACKGROUND

Cloud-based platforms have become increasingly common. Cloud data centers are challenged to provide high performance and quality service. Cloud-based services may have interdependencies on each other, where a single request can be processed by multiple services within a given cloud-computing environment. When a failure occurs, it can be difficult to ascertain which cloud service may be at fault. Conventional techniques for failure detection often include various human administrators communicating with one another through various means to troubleshoot an existing failure. Conventional techniques lack accuracy in some use cases with respect to identifying which particular cloud service is the cause of the existing failure.

BRIEF SUMMARY

Techniques are provided (e.g., a method, a system, non-transitory computer-readable medium storing code or instructions executable by one or more processors) for detecting a failure (e.g., a failure of a particular service) in a cloud-computing environment. Various embodiments are described herein, including methods, systems, non-transitory computer-readable storage media storing programs, code, or instructions executable by one or more processors, and the like.

One embodiment is directed to a method for detecting and localizing failures in a cloud-computing environment. The method may include capturing call stack data corresponding to a plurality of cloud-computing resources. In some embodiments, the call stack data is captured by a plurality of proxy devices that are distinct from the cloud-computing resources. The method may further include generating a directional graph comprising a plurality of nodes and a plurality of edges. Each of the plurality of nodes of the directional graph may correspond to a resource (e.g., a service, a database, a storage device, etc.) of the plurality of cloud-computing resources. In some embodiments, each edge of the plurality of edges represents a communications path between a pair of cloud-computing resources of the plurality of cloud-computing resources. The method may further include identifying a plurality of ingress communication paths to a cloud-computing resource (e.g., a particular service, etc.) based at least in part on identifying a plurality of communications paths from the directional graph that end at the cloud-computing resource. The method may further include calculating a plurality of metrics corresponding to each of the plurality of ingress communication paths ending at the cloud-computing resource based at least in part on the call stack data. The method may further include presenting, at a user interface, the directional graph and the plurality of metrics for each of the plurality of ingress communication paths. The method may further include identifying, based at least in part on the plurality of metrics corresponding to each of the plurality of ingress communication paths, that a failure exists between two cloud-computing resources corresponding to a particular communication path. The method may further include providing a notification indicating existence of the failure.

Another embodiment is directed to a cloud-computing system comprising one or more processors and one or more non-transitory computer-readable instructions that, when executed by the one or more processors, cause the cloud-computing system to perform the disclosed methods.

Yet another embodiment is directed to a non-transitory computer-readable storage medium storing computer-executable instructions that, when executed by one or more processors of a computing device, cause the computing device to perform the disclosed methods.

The foregoing, together with other features and embodiments will become more apparent upon referring to the following specification, claims, and accompanying drawings.

BRIEF DESCRIPTION OF THE DRAWINGS

Various embodiments in accordance with the present disclosure will be described with reference to the drawings, in which:

FIG. 2 is an example table that represents exemplary data obtained by the proxy components of cloud-computing environment of FIG. 1, in accordance with at least one embodiment.

FIGS. 5A and 5B are block diagrams depicting a number of use cases in which a number of latency values may be calculated and utilized to identify a source of failure, according to at least one embodiment.

DETAILED DESCRIPTION

Figure 1:
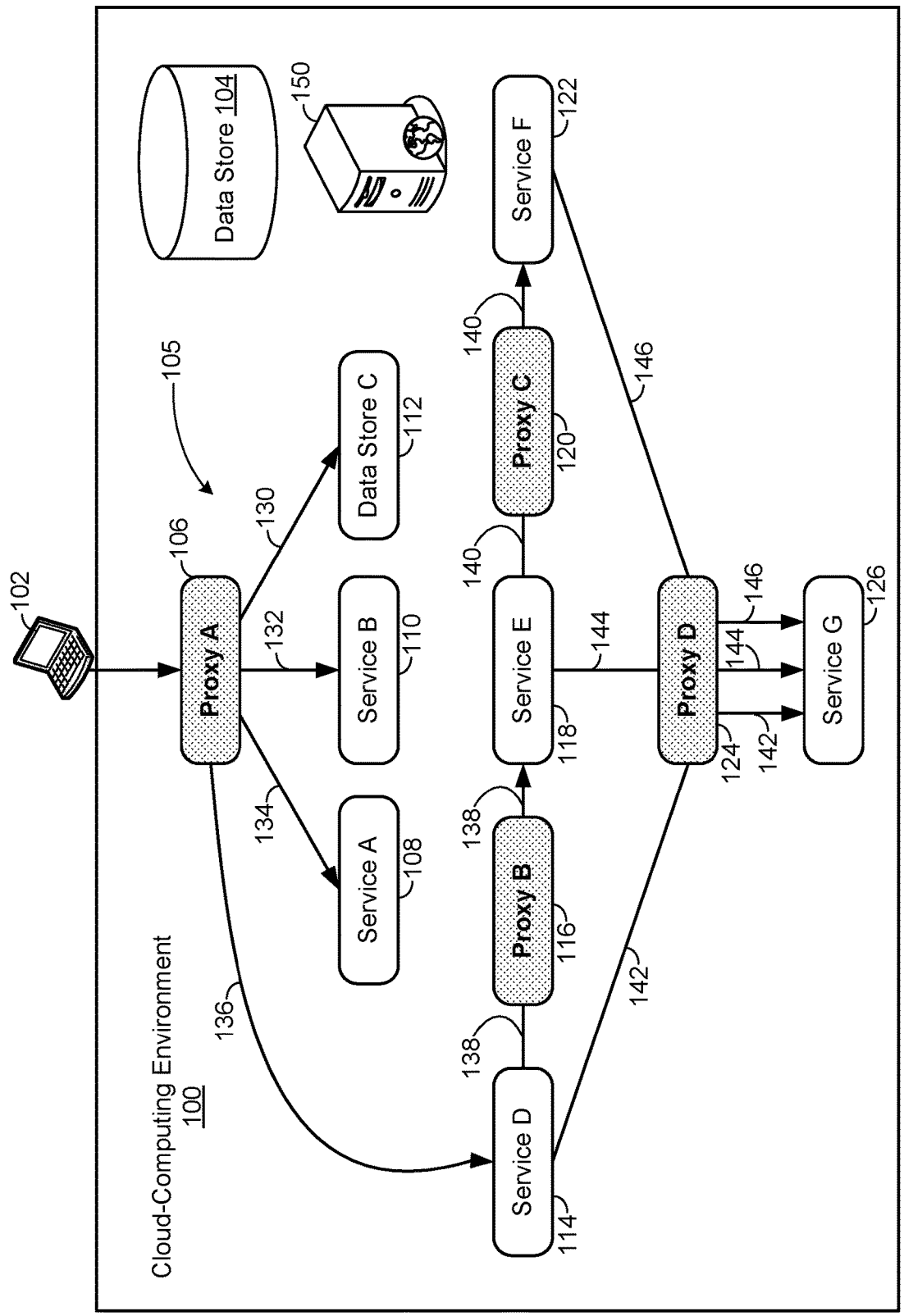
FIG. 1 illustrates an example cloud-computing environment including a number of cloud-computing components, in accordance with at least one embodiment.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

The present disclosure relates to detecting failures in a cloud-computing environment. Conventionally, when cloud-computing resources (e.g., services, etc., also referred to as "resources," for brevity) experience failure (e.g., latency and/or success/failure rates that exceed respective predefined thresholds), it can be difficult to isolate and identify the source of the failure. In some conventional systems, when a failure occurs, a number of administrators of various services may converge to discuss an issue. Identifying the failure in these situations is largely a manual process, which can cause delay in identifying the source of the failure. Additionally, while many cloud-computing systems collect resource health data (also referred to as "health data"), this health data may only concern a single service and can be misleading. By way of example, various metrics of a given service may indicate that the service is responding to some relatively large amount of received requests. As a result, the service may be considered healthy (e.g., as determined by a success rate, a ratio of successful responses versus requests, of the service is above a predefined threshold, or a failure rate, a ratio of responses indicating an error versus request is below a predefined threshold). However, that may not be the whole story—e.g., there may be a specific integration between this service and another service that is faulty. In some cases, because the traffic between these two resources may only account for some relatively small amount of the overall traffic handled by the service, the failure between these two resources may go undetected. Thus, even though the service itself may seem healthy based on its own health data, there may be another issue.

In some embodiments, function calls related to processing a client request may be tracked through a cloud-computing environment from resource to resource (e.g., from service to service) using call stack information. These calls may be routed between services through a number of proxy devices that are configured to collect the call stack information corresponding to a function call between services. Call stack information, as used herein, may include data such as a source of the call, a destination of the call, one or more identifiers (e.g., an identifier assigned by a client device, a gateway device, or a destination service), a timestamp indicating a time at which the call was initiated, and a response code that indicates the processing of the call (also referred to as a request) was successful or unsuccessful. In some embodiments, the proxy devices may calculate a latency value corresponding to a time period between request and response.

A directional graph may be generated from the call stack information. The directional graph may include nodes that represent the cloud-computing resources and edges that individually represent a communication path between a pair of resources. The communication path may be identified by identifying a function call from one service to another from the call stack information.

In some embodiments, a number of metrics may be calculated (e.g., by a proxy device, by a data processing device) for each edge of the graph. Call stack information corresponding to a number of client requests that were processed within a given time period may be collected for each edge. A latency value quantifies the latency (e.g., via percentiles, an average, etc.) for requests between a pair of services may be calculated and associated with the edge between the nodes that represent those services. Similarly, a success rate value quantifying a percentage of the total number of requests that were successfully processed by the destination service may be calculated. In some embodiments, a failure rate value quantifying a percentage of the total number of requests that were unsuccessful as indicated by the destination service may be utilized.

For a given destination service, a number of ingress communication paths may be identified (e.g., paths that terminate at the destination service). These paths may be identified from the call stack information collected by the proxy devices. Any suitable combination of the destination service and/or one or more integrations between a pair of services (e.g., each source service and the destination service) may be identified as a potential source of failure based at least in part on the metrics associated with the edges of the graph.

The techniques discussed herein provide for improved failure detection over conventional systems. Conventionally, the health of a service is localized such that a service may be considered healthy so long as it processes over some threshold of all requests (e.g., over 95% of the requests it receives). However, when an integration between another service accounts for a relatively small percentage of the overall number of received requests, failure in this integration can go undetected in conventional systems because these failures do not cause enough of an impact to be detected. The techniques discussed herein improve the ability of a cloud-computing system to detect and identify various types of failures, including those related to a particular communication path and/or integration between services that may previously have been far more difficult, if not impossible, to detect in conventional systems.

Moving on to FIG. 1, in which an example cloud-computing environment 100, including a number of cloud-computing components, in accordance with at least one embodiment. As a non-limiting example, cloud-computing environment 100 includes a number of proxy components (e.g., computing devices, servers, services, etc., labeled proxy A-D) and a number of cloud-computing resources (e.g., resources such as services A, B, D, E, and G and data stores C and F, collectively referred to as "the cloud-computing resources," "the resources," or "resources A-G"). Although a particular number of components are depicted, it should be understood that the particular number used is not intended to limit the scope of this disclosure. Any suitable number and combination of components (e.g., proxy components, cloud-computing resources, etc.) may be similarly utilized.

In some embodiments, a proxy component (e.g., proxy A) may be configured to operate as a gateway to one or more resources (e.g., resources A-G and, potentially, other resources of the cloud-computing environment 100 that are not depicted). As a non-limiting example, proxy A may be configured to receive requests from any suitable external source such as client device 102 and forward requests to services A, B, D, and data store C). Client device 102 may be external in the sense that it is not operating as part of the cloud-computing environment 100. Proxy B-D may individually be configured to be disposed between various pairs of resources. As depicted, proxy B is disposed between service D and E, proxy C is disposed between service E and service F, and proxy D is disposed between service D and service G, between service E and service G, and between service F and service G. In some embodiments, proxies A-D may be a single or distributed service that may each be configured to access a common storage (e.g., data store 104). In some embodiments, a proxy component may be configured to monitor traffic specific to a particular pair of resources or to a particular resource. For example, proxy B may be configured to operate as a proxy component for communications between service D and service E and no other, while proxy D may be configured to operate as a proxy component for service G regardless of what other resource is communicatively connected to service G through proxy D (e.g., services D, E, and service F). Thus, while FIG. 1 depicts proxies A-D as being separate and distinct, in some embodiments, each of the proxies A-D may be a common component of the cloud-computing environment 100.

In some embodiments, a request received from client device 102 may travel through the cloud-computing environment through various function calls. Each resource called via a function call may provide some portion of the functionality needed to fulfill and/or process the request. A proxy component may be configured to route data between a pair of resources. As part of this routing, each proxy component may be configured to collect call stack information such as a source, a destination, an ingress identifier, an egress identifier, a timestamp associated with communication of the data between resources. The proxy component can track times between a request transmitted from a first resource to a second resource and a response corresponding to that request being received from the second resource. The proxy component may be configured to calculate a latency value corresponding to a time period between transmission of a request and receipt of a response. In some embodiments, a proxy component may be configured to collect a response code (e.g., a return value) corresponding to a response.

FIG. 2 is an example table 200 that represents exemplary data obtained by the proxy components of cloud-computing environment of FIG. 1, in accordance with at least one embodiment. Some of the data of table 200 may be obtained by a proxy component by accessing a call stack structure associated with a given client request (e.g., a request initiated by a client device such as client device 102 of FIG. 1) and some of the data of table 200 may be calculated based on the data obtained from the call stack structure (not depicted). A call stack structure is intended to refer to a data structure of a computing environment which identifies the active subroutines of a given request (e.g., such as client request was routed to service A, that then called a function of service D, that then called a function of service G, etc.). Each row of table 200 may correspond to a particular communication between a pair of cloud-computing components.

By way of example, table 200 may include a source column (e.g., column 202). The source column may include a number of source identifiers that may be utilized to uniquely identify a source (e.g., a cloud-computing component) which initiated a function call or other communication between two cloud-computing components.

Table 200 may include a destination column (e.g., column 204). The destination column may include destination identifiers that uniquely identify a destination (e.g., a cloud-computing component) being called or that is to be receiving a communication.

Table 200 may include an ingress identifier (ID) column (e.g., column 206). The ingress column may include ingress identifiers corresponding to each communication between two cloud-computing components. In some embodiments, the ingress ID may include any suitable combination of one or more identifiers that are unique to the client request. By way of example, a client device (and/or gateway) may assign any suitable number of identifiers (e.g., a request identifier ("reqID")) to a given client request with which the client request can be uniquely identified. In some embodiments, a call stack identifier ("stackID") may be obtained by a proxy component (e.g., proxy A). The call stack identifier may be any suitable alphanumeric identifier that uniquely identifies the call stack for a given client request.

Table 200 may include an egress ID column (e.g., column 208). The egress column may include any suitable number of egress identifiers that uniquely identify a response corresponding to the request. In some embodiments, the egress identifier may be assigned, at least in part, by the destination component. By way of example only, an egress identifier could be a combination of one or more identifiers (e.g., the reqID/stackID of column 206) and a destination request identifier ("dsReqID") assigned by the destination resource.

Table 200 may include a created on column (e.g., column 210) that includes a timestamp at which a communication was created (e.g., a timestamp at which a function call was executed). The timestamps of column 210 may be in any suitable format.

Table 200 may include latency column (e.g., column 212) that includes a latency value corresponding to a time between when the communication was created (e.g., when the function call was made) and when a response to the communication was received (e.g., a return value was received).

Table 200 may include response code column (e.g., column 214). A response code may be any suitable value (e.g., a return value or values) provided by the destination component in response to the request. The response code may be any suitable alphanumeric identifier that identifies a status, result, or outcome of the request. In some embodiments, the response code may indicate a positive or negative result. For example, a response code of "20" may indicate that the request was processed successfully (e.g., no errors were encountered by the destination component when processing the request) while a response code of "40" may indicate failure (e.g., one or more errors were encountered by the destination component when processing the request). Any suitable number of predefined response codes may be utilized to indicate success or failure.

Each row of the data may be obtained and/or generated by a particular proxy component of a cloud-computing environment. For example, each row of table 200 may correspond to a particular communication and/or function call between two cloud-computing components of FIG. 1 during the processing of a particular client request.

Returning to FIG. 1 for illustration, a client request may be received by proxy A from client device 102. Proxy A may be previously configured to act as a gateway for cloud-computing environment 100. In some embodiments, the client request may include includes a client identifier (e.g., an alphanumeric identifier) that was assigned by the client device (either automatically or via user input). As part of the processing of the client request, proxy A may be configured to route the request to a number of other cloud-computing components such as service A, service B, data store C, and service D as depicted by the corresponding arrows depicted in FIG. 1. As part of processing the client request, service D may call service E and service G to execute various functionality. Proxy B may be configured to route one function call (also referred to as a "request") from service D to service E, while proxy D may be configured to route the function call from service D to service G. Service E may be configured to execute function calls to service F and service G. Proxy D may be configured to route the function call from service E to service G and proxy C may be configured to route the function call from service E to service F.

As each proxy component receives a client request and/or function call or other communication, the proxy component may obtain call stack data corresponding to the client request using the client request ID. From this, the proxy component may identify a destination of the function call and may store this identifier in an entry of table 200 of FIG. 2. The proxy component may store the ingress identifier received and timestamp the function call within the corresponding entry of table 200. The proxy component may then receive at a later date a response code within a communication (e.g., a response message, a return value, etc.) corresponding to the function call/request provided by the source. The proxy component may then store the response code and calculate a latency value that quantifies a time between the timestamp of the request and receipt of the response code. The proxy component may store this data locally or at a centralized location (e.g., data store 104, configured to store call stack data collected or generated by one or more proxy components involved in processing the client request). In some embodiments, the data store 104 is a distributed data store implemented by the proxy components of FIG. 1 in which some or all of the proxy components of FIG. 1 may store their respective data of table 200.

As a specific example, client device 102 may initiate a client request (identified by a request ID). Proxy A may receive the client request and may access call stack data corresponding to the request ID that indicates service A, B, D, and data store C are to be called. Proxy A may store call stack data corresponding to each call. For example, any suitable information related to the call to service A may be stored in row 1 of table 200. For example, proxy A may store an identifier for proxy A in row 1, column 202, an identifier for the destination of the call (e.g., service A) in row 1, column 204, and an ingress ID (e.g., the request ID assigned by the client device 102 and a stack identifier assigned by proxy A). A time at which proxy A received the request may be stored in row 1, column 210. Proxy A may then forward the function call to service A. Service A may assign its own request identifier (e.g., dsReqID1) to the request/communication and execute operations corresponding to the function call. Sometime later, service A may return a response code (e.g., response code 20, indicating successful processing) to proxy A. Upon receipt, proxy A may store the identifier assigned to the communication by the service A (e.g., a combination of request ID, stack ID, and dsReqID1) and calculate a latency value quantifying the time between when proxy A received the client request and when the response code was received. Proxy A may repeat this processing for each request/communication provided to service B, data store C, and service D. The corresponding data from this processing may be stored as rows 2-4 of table 200, respectively.

Service D may execute operations for the request from proxy A that causes it to call service E and G. Proxy B and D may each perform similar operations as proxy A to obtain the data for row 5 and 6 of table 200, respectively. Service E may execute operations for the request from service D (via proxy B) by executing a function call to service F and service G. Proxy D and C may each perform similar operations as proxy A to obtain the data for rows 7 and 8 of table 200, respectively. Service F may execute operations for the request from service E (via proxy C) by executing a function call to service G. Proxy D may perform similar operations described above to obtain the data for row 9 of table 200. In some embodiments, the response code for the request from service D to service E, corresponding to row 5 of table 200, may not be received until response codes are received from the function calls to service F and service G.

Using the data of table 200, a data processing component of cloud-computing environment may be configured to generate directed graph (e.g., graph 105, representing communication pathways between cloud-computing components of the cloud-computing environment). Each node of the graph 105 (e.g., nodes 106-126) may represent a cloud-computing component such as a resource (e.g., service A, B, D, E, F, and G, and data store C) and/or a proxy component (e.g., proxy A-D). In this example, proxy A can be considered both i) a cloud-computing resource due to its role as gateway to the cloud-computing environment 100 and a proxy component due to the execution of operations for collecting and/or generating call stack data (corresponding to rows 1-4 of table 200). Each edge of the graph (edges 130-146) may represent a communication pathway (also referred to as a "communication path" or "path") between pairs of cloud-computing resources. For example, edge 138 may represent a communication pathway between service D and E (via proxy B). The edge 138 may correspond to the communication pathway from service D, through proxy B, to service E. Row 5 of table 200 may store any suitable data related to that communication pathway for that specific client request.

The graph may be utilized to identify communication pathways such that call stack data corresponding to those pathway may be analyzed to detect potential failures of one or more resources within the cloud-computing environment 100. By way of example, table 200 represents the processing of one client request. Data corresponding to the processing of many requests may be aggregated and utilized (e.g., by one or the proxy components of FIG. 1 and/or data processing device 150, a device configured to perform such detection processing) in order to detect potential failures within the cloud-computing environment 100.

Figure 3:
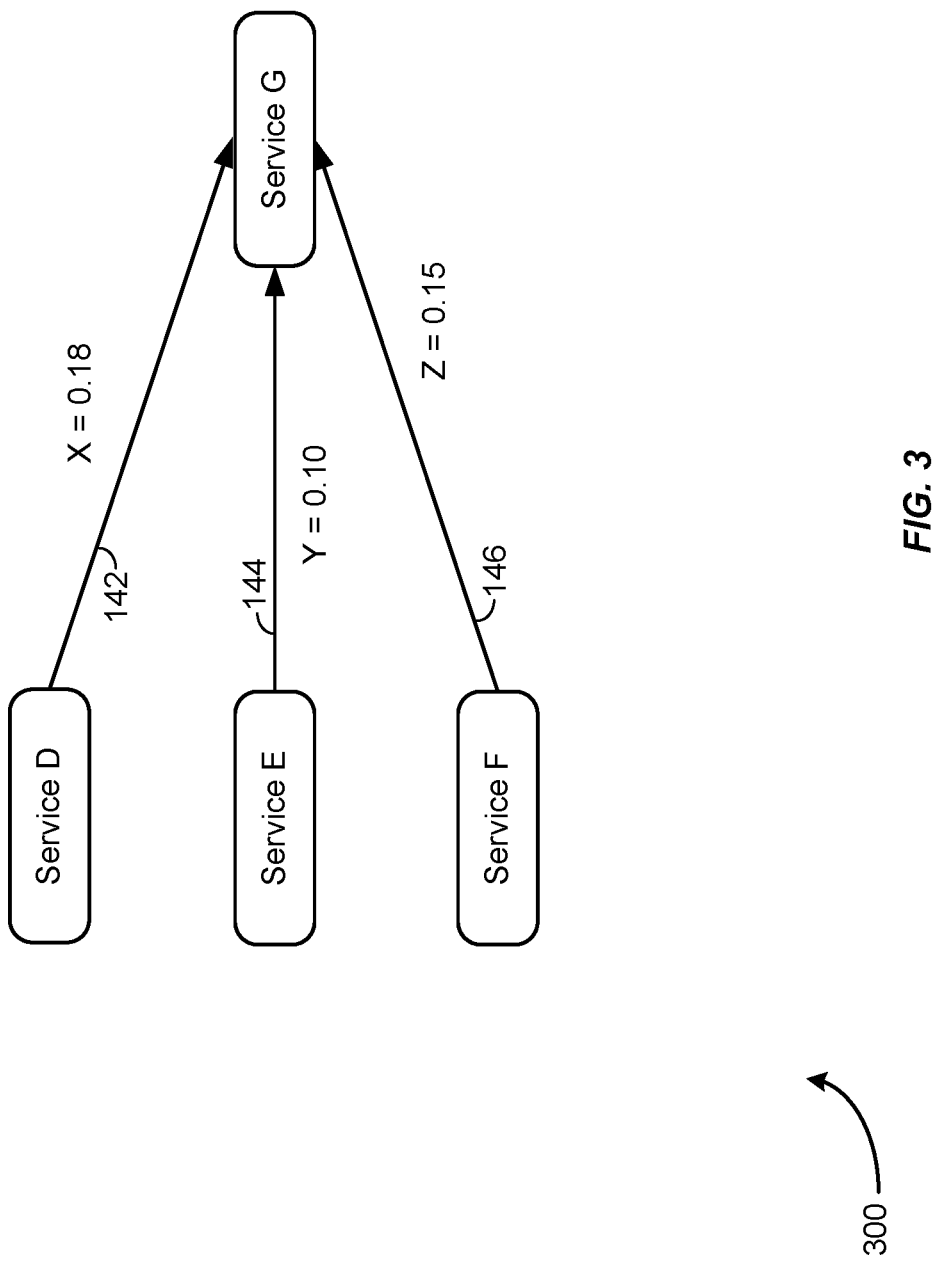
FIG. 3 illustrates an example use case in which a number of metrics are calculated based at least in part on a number of ingress communication paths corresponding to a given service, in accordance with at least one embodiment.

FIG. 3 illustrates an example use case 300 in which a number of metrics are calculated based at least in part on a number of ingress communication paths corresponding to a given service, in accordance with at least one embodiment. The operations discussed in connection with FIG. 3 may be performed by the data processing device 150 of FIG. 1 and/or by any suitable proxy component of the cloud-computing environment 100 of FIG. 1. Although the following example may refer to operations performed by the data processing device 150, these same operations may be performed by any suitable combination of the proxy components of FIG. 1.

At any suitable time, the data processing device 150 may collect any suitable number of instances of call stack data corresponding to ingress communication pathways that include a common endpoint. For example, the data processing device 150 may identify a plurality of ingress communication paths to a cloud-computing resource (e.g., service G). The data processing device 150 may identify a number of directional edges that indicate one or more communication paths that terminate at service G. These directional edges may indicate that the functionality of service G was invoked by service D at least one time.

In some embodiments, the data processing device 150 may obtained data for each edge (e.g., edges 142-146) using a hopping window (e.g., a non-overlapping five minute window) or sliding window (e.g., a window that moved every one minute that covers the past five minutes). For example, the data processing device 150 could use a hopping window or a sliding window to obtain call stack data corresponding to any requests/function calls that invoked the functionality of service G within a time period corresponding to the window (e.g., requests/function calls that occurred in the last five minutes, the last minute, the last hour, etc.).

In some embodiments, a predefined threshold (e.g., a success-rate threshold) may be utilized to identify a minimum acceptable success rate. By way of example, a success-rate threshold may be set to 0.9 (representing 90%) indicating that a path is to be identified as a potential failure if less than 90% of the requests/calls corresponding to that path succeed (returns a response code indicating success). In some embodiments, the success-rate threshold may be expressed as a failure threshold. For example, the success-rate threshold may be set to 0.1 to indicate that a path is to be identified as a potential failure if it produces a failure (e.g., time out, returns a response code indicating failure) for more than 10% of the requests associated with that path. A failed request refers to a request for which a response has not been received by a threshold period of time from when the request was created or a request for which a failed response code was received in a corresponding response. As a non-limiting example, a response code of "40" may indicate that the destination service encountered a failure, error, exception when processing the request.

As a non-limiting example, call stack data (including rows 6, 7, and 9 of table 200 that indicate a destination of service G) may be aggregated and the error codes corresponding to this call stack data may be analyzed by the data processing device 150. The data processing device 150 may be configured to calculate, for each path, a success rate at which a given resource (e.g., service G) successfully processes the requests it receives within the time period corresponding to the call stack data.

For example, the data processing device 150 may identify a total number of requests (e.g., function calls) that were invoked the functionality of service G from service D (via proxy D) within a given time window (e.g., the last two minutes). These requests between service D and G may stem from any suitable number of client requests. The data processing device 150 may calculate a success rate value (e.g., X=0.18, or 18%) that quantifies how many of those requests succeeded (e.g., resulted in a response code that indicated successful processing). In some embodiments, the success rate value may be expressed as a percentage. The data processing device 150 may associated the calculated success rate value with the edge 142.

In a similar manner, call stack data from the last two minutes may be collected for each of the edges 144 and 146 of the graph 105. In some embodiments, each of the success rate values corresponding to edges 144 and 146 may be calculated in a similar manner described above with respect to edge 142. Given a success-rate threshold of 0.9 (indicating a failure is to be identified when a rate/ratio of successful requests is below 0.9), the data processing device 150 may identify service G as a failure source based on the success rate value of a number of communication paths (e.g., over a threshold number of paths, all, etc.) corresponding to edges 142, 144, and 146 failing to exceed the predefined success-rate threshold. Said another way, data processing device 150 may identify service G as a failure source based at least in part on identifying that each edge that terminates at a node corresponding to service G (e.g., edges 142-146) is associated with a success-rate (e.g., X=0.18, Y=0.10, and Z=0.15, respectively) that indicates the percentage of successfully processed requests provided by service G falls below the predefined success-rate threshold of 90%. In some embodiments, service G may be identified as being a potential failure source if more than a threshold number or percentage of edges that terminate at service G are found to have success rate values that fall below the success-rate threshold. For example, in some embodiments, service G may be deemed to be a potential source of failure if the number or percentage of edges that fail to exceed the success rate threshold exceeds another predefined threshold (e.g., more than two edges, more 50% of the edges, more than 60% of the edges, etc.).

Figure 4:
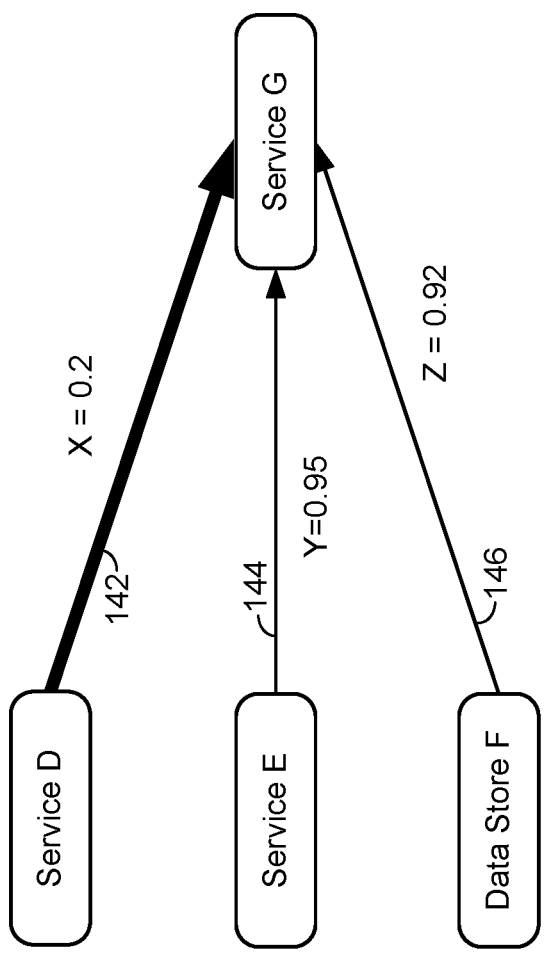
FIG. 4 illustrates another example use case in which a number of metrics are calculated based at least in part on a number of ingress communication paths corresponding to a given service, in accordance with at least one embodiment.

FIG. 4 illustrates another example use case 400 in which a number of metrics are calculated based at least in part on a number of ingress communication paths corresponding to a given service, in accordance with at least one embodiment.

The success rate values (e.g., X=0.20, Y=0.95, and Z=0.92) may be calculated in the manner described above in connection with FIG. 3. That is, call stack data corresponding to a given time window may be evaluated for each edge. In some embodiments, the call stack data may include rows 6, 7, and 9 of table 200, which may each be associated with a respective function call performed as part of the processing of a particular client request.

In the example depicted in FIG. 4, only one edge (e.g., edge 142) is associated with a success rate value that fails to exceed the success rate threshold. In some embodiments, because only one edge (or a number of edges that does not exceed a predefined threshold of say two edges or 50% of the total number of edges that terminate at service G) is associated with a success rate value that indicates failure, the data processing device 150 may be configured to identify the integration between service D and service G as potentially being a source of failure.

In some embodiments, the data processing device 150 may provide one or more user interfaces with which the graph 105 and any suitable call stack data corresponding to the graph 105 may be viewed. In some embodiments, the data processing device 150 may provide a graphical representation of the graph 105 and providing options to view call stack data and/or any suitable metric calculated for a given edge. Policies for how these metrics are to be calculated may be configurable by the user via these interfaces. By way of example, user input may be received that defines a time period (e.g., 5 minutes, 10 minutes, 1 hour, 1 day, etc.) for a query window and a type of query window (e.g., a hopping window, a sliding window, etc.) to be used to calculate the various metrics (e.g., success rate values, latency values, etc.). In some embodiments, a user interface provided by the data processing device 150 may provide visual representations of failure sources by visually identifying (e.g., through the user of color, text, flashing, animation, or the like) a specific edge and/or resource as a potential failure source.

In some embodiments, data processing device 150 may be configured to transmit a notification via any suitable electronic method of communication (e.g., email, text messaging, alarms, alerts, push notifications, or the like) to notify one or more entities (e.g., one or more administrators, such as an administrator associated with service G) that service G may be the source of a failure in light of the success rate values corresponding to edges 142-146.

Conventionally, the potential failure of the integration between service D and service G may go undetected. For example, in a scenario in which the requests provided by service D only contribute to a relative small portion (e.g., less than 5%, less than 2%, etc.) of the total requests processed by service G, health statistics associated with service G may indicate that it is successfully processing most of the requests it receives (e.g., 98%). Because it is successfully processing a high percentage of the requests it receives, conventional health data is not useful in identifying that a failure exists in a particular integration between services. Thus, the techniques discussed herein improve the ability of a cloud-computing system to detect and identify a number of failures that may previously have been far more difficult, if not impossible to detect in conventional systems.

FIGS. 5A and 5B are block diagrams depicting use cases 500A and 500B, respectively, in which a number of latency values may be calculated and utilized to identify a source of failure, according to at least one embodiment.

At any suitable time, the data processing device 150 may collect any suitable number of instances of call stack data corresponding to ingress communication pathways that include a common endpoint. As described above in connection with FIG. 3, the data processing device 150 may identify a plurality of ingress communication paths to a cloud-computing resource (e.g., service G). The data processing device 150 may identify a number of directional edges that indicate one or more communication paths that terminate at service G. These directional edges may indicate that the functionality of service G was invoked by service D at least one time.

In some embodiments, the data processing device 150 may obtain data for each edge (e.g., edges 142-146) using a timing window such as a hopping window (e.g., a non-overlapping five minute window) or a sliding window (e.g., a window that moved every one minute that covers the past five minutes). For example, the data processing device 150 could use a hopping window or a sliding window to obtain call stack data corresponding to any requests/function calls that invoked the functionality of service G within a time period corresponding to the window (e.g., requests/function calls that occurred in the last five minutes, the last minute, the last hour, etc.). If the call stack data was already aggregated (e.g., to calculate the success rate values discussed above), the data processing device 150 need not collect the data again. Rather, it may reuse the data already collected to avoid wasteful processing.

As a non-limiting example, call stack data (including rows 6, 7, and 9 of table 200 that indicate a destination of service G) may be aggregated and a corresponding latency value may be calculated for each edge. As a non-limiting example, a latency value for an edge may be used to quantify an average time period between invoking the functionality of service G through a request (e.g., a function call) and receiving a response to the request.

For example, the data processing device 150 may add together all of the latency values corresponding to each request from service D to service G that occurred within the given timing window (e.g., the last two minutes). The sum of these latency values may then be divided by the total number of requests to obtain an average latency value (e.g., two seconds) for the edge 142. In a similar manner, call stack data may be collected for each of the edges 144 and 146 of the graph 105 using the timing window. In some embodiments, each of the latency values corresponding to edges 144 and 146 may be calculated in a similar manner described above with respect to edge 142.

The data processing device 150 may utilize a predefined latency threshold (e.g., a threshold of one second, indicating a failure is to be identified when a latency value exceeds one second), to identify one or more failure sources. FIG. 5A depicts an example in which service G is identified by the data processing device 150 as a failure source based at least in part on the latency values of the edges 142, 144, and 146 (e.g., two seconds, 2.1 seconds, and 2.4 seconds, respectively) each exceeding the predefined latency threshold of two seconds. In some embodiments, service G may be identified as being a potential failure source if more than a threshold number or percentage of edges that terminate at service G are found to have latency values that exceed the predefined latency threshold. For example, in some embodiments, service G may be deemed to be a potential source of failure if the number (e.g., more than two, three or more, etc.) or a percentage (e.g., 50%, 60%, etc.) of edges that are associated with a latency value that exceeds the predefined threshold.

FIG. 5B depicts an example in which a particular communication path (e.g., the path corresponding to edge 142) is identified as being a potential failure source given the scenario in which edge 142 it the only edge that is associated with a latency value that exceeds the predefined latency threshold.

As discussed above, previous systems localized health data to a given service and did not analyze latency values corresponding to a communication path in order to identify potential failure sources. Thus, the techniques described herein, which utilize any suitable combination of the latency values and/or success rate values discussed above, provide improvements to failure detection over conventional systems where these potential failures would go undetected by the system.

Figure 6:
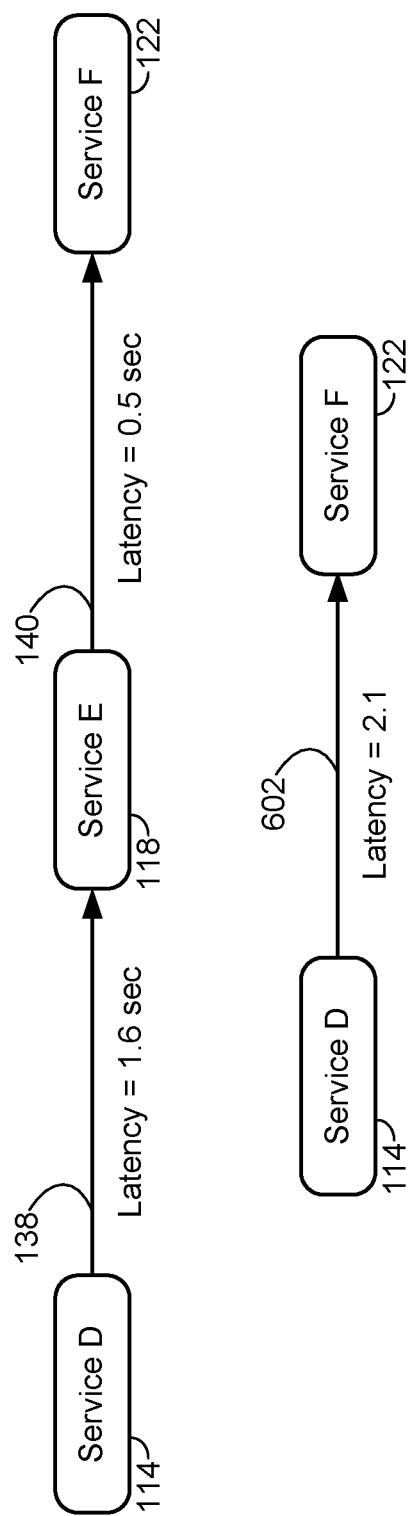
FIG. 6 is a block diagram illustrating an example method for detecting a failure of an integration between non-adjacent resources, according to at least one embodiment.

FIG. 6 is a block diagram illustrating another example method 600 for detecting a failure of an integration between non-adjacent resources, according to at least one embodiment. In some embodiments, a communication path can be considered to include more than one edge. A communication path that includes more than one edge can be referred to as an aggregate path. For example, edges 138 and 140 may individually represent a communication path between service D and service E and between service E and service F, respectively. Collectively, the edges 138 and 140 may be used to define edge 602, an aggregate path between service D and service F. Edge 602 may be utilized to represent an integration between service D and service F (via service E).

The data processing device 150 may be configured to identify the aggregate path based at least in part on identifying a request that was initiated by service D, passed to service E, and then ultimately processed by service F. The data processing device 150 may calculate the metrics for edges 138 and 140 as described above. These metrics may be combined to calculate one or more metrics for edge 602. By way of example, data processing device 150 may calculate latency values for edges 138 and 140 and aggregate these latencies values to identify a latency value for edge 602. While the latency values of edges 138 and 140 do not individually exceed a predefined latency threshold (e.g., two seconds), the latency value associated with edge 602 does exceed the value. Thus, a failure between service D and service F may be identified when conventionally this failure would go undetected. The data processing device 150 may aggregate any suitable number of edges to create an aggregate edge (of which edge 602 is an example).

By utilising the techniques discussed in FIGS. 3-6, service failures and integration issues may be identified from a variety of granular views. For example, these techniques can be used to identify failures in a particular service, between adjacent services (e.g., where once service directly calls the other), as well as between non-adjacent services in which one service (e.g., service D) initiates a function call that ultimately causes the functionality of another service (e.g., service F) to be invoked by one or more intervening services (e.g., service E, in this example).

Figure 7:
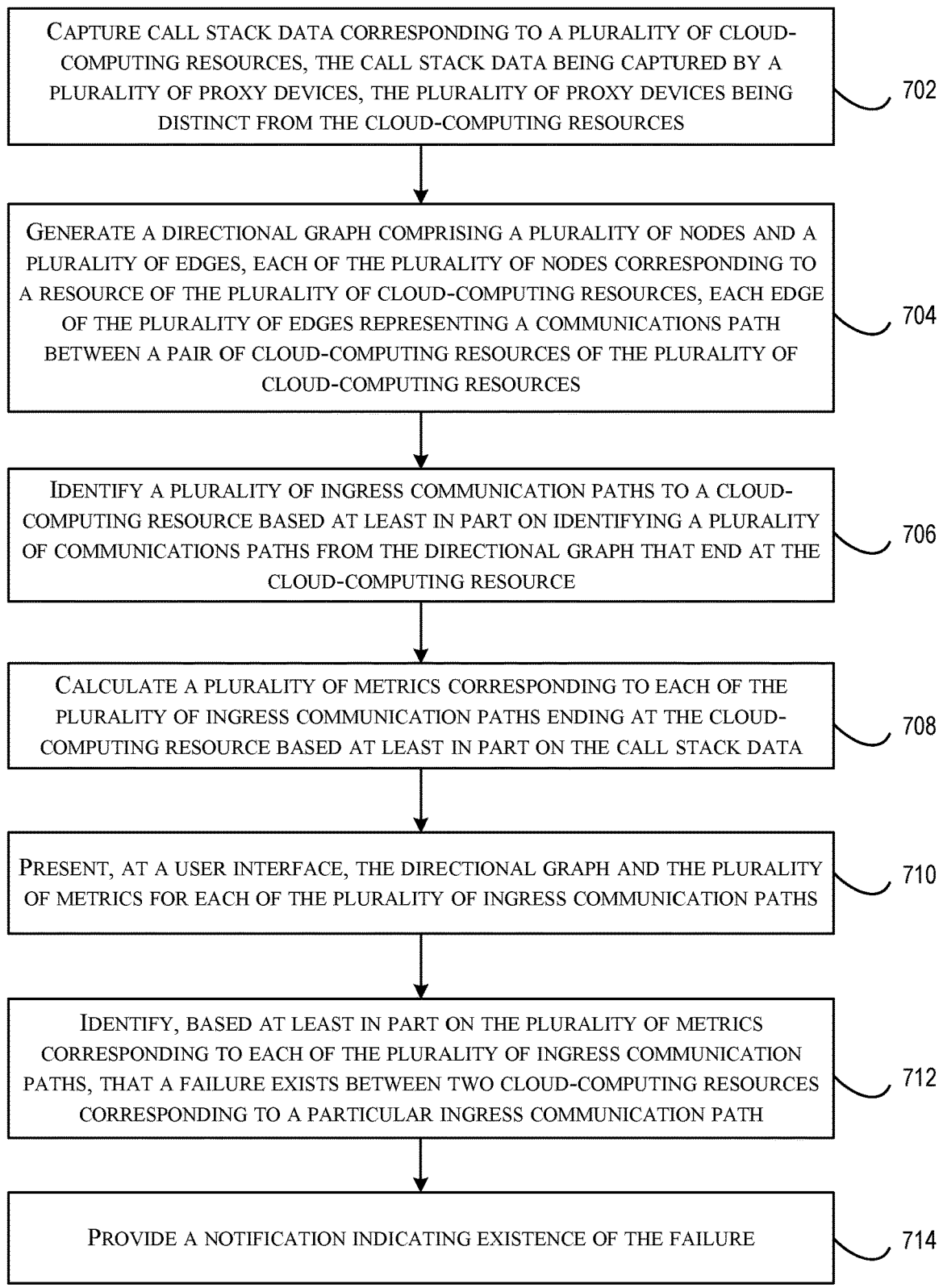
FIG. 7 is a block diagram illustrating an example method for detecting a failure within a cloud-computing environment, according to at least one embodiment.

FIG. 7 is a block diagram illustrating another example method 700 for detecting a failure within a cloud-computing environment, according to at least one embodiment. The operations of method 700 may be performed by the data processing device 150 of FIG. 1 or by any suitable combination of the proxy components of FIG. 1. The operations of method 700 may be performed in any suitable order. The method 700 may include more or fewer operations than those depicted in FIG. 7.

The method 700 may begin at 702, where call stack data corresponding to a plurality of cloud-computing resources is captured (e.g., collected, logged, etc.). In some embodiments, the call stack data may include at least some portion of the data from table 200 of FIG. 2. The call stack data may be captured by a plurality of proxy devices (e.g., the proxy components of FIG. 1). In some embodiments, the proxy devices (e.g., proxy servers) may be separate and distinct from the cloud-computing resources. In some embodiments, the proxy devices may be services that are separate and distinct from the cloud-computing resources.

At 704, a directional graph (e.g., graph 105 of FIG. 1) can be generated (e.g., from the call stack data captured at 702). In some embodiments, the directional graph comprises a plurality of nodes and a plurality of edges. Each of the plurality of nodes of the graph may correspond to a resource of the plurality of cloud-computing resources. In some embodiments, each edge of the plurality of edges represents a communications path between a pair of cloud-computing resources of the plurality of cloud-computing resources.

At 706, a plurality of ingress communication paths to a cloud-computing resource may be identified. By way of example, a number of ingress communication paths may be identified based at least in part on identifying a plurality of communications paths from the directional graph (e.g., paths corresponding to edges 142, 144, and 146 of FIG. 1) that end at the cloud-computing resource (e.g., service G).

At 708, a plurality of metrics corresponding to each of the plurality of ingress communication paths ending at the cloud-computing resource may be calculated. By way of example, a latency value and/or a success rate value may be calculated by the data processing device 150. In some embodiments, the plurality of metrics may be calculated based at least in part on the call stack data (e.g., the data of table 200).

At 710, the directional graph and the plurality of metrics for each of the plurality of ingress communication paths may be presented at a user interface. By way of example, a graphical representation of the directional graph may be presented at a user device (e.g., client device 102 or another device operated by a user).

At 712, the data processing device 150 may identify, based at least in part on the plurality of metrics corresponding to each of the plurality of ingress communication paths, that a failure exists between two cloud-computing resources corresponding to a particular communication path. In some embodiments, the data processing device 150 may identify edge 142 as potentially being a source of failure based at least in part on at least one of the latency value and/or success rate value calculated for that edge as discussed in FIGS. 3, 4, 5A, and 5B.

At 714, a notification indicating existence of the failure may be provided. By way of example, an electronic message, an alarm, a push notification, or the like may be generated to notify a user of the potential failure. By way of example, a text message or electronic email may be transmitted an administrator associated with at least one of the resources (e.g., an administrator associated with service D and/or service G in the examples provided in FIGS. 3, 4, 5A, and 5B).

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, load balancing and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 8:
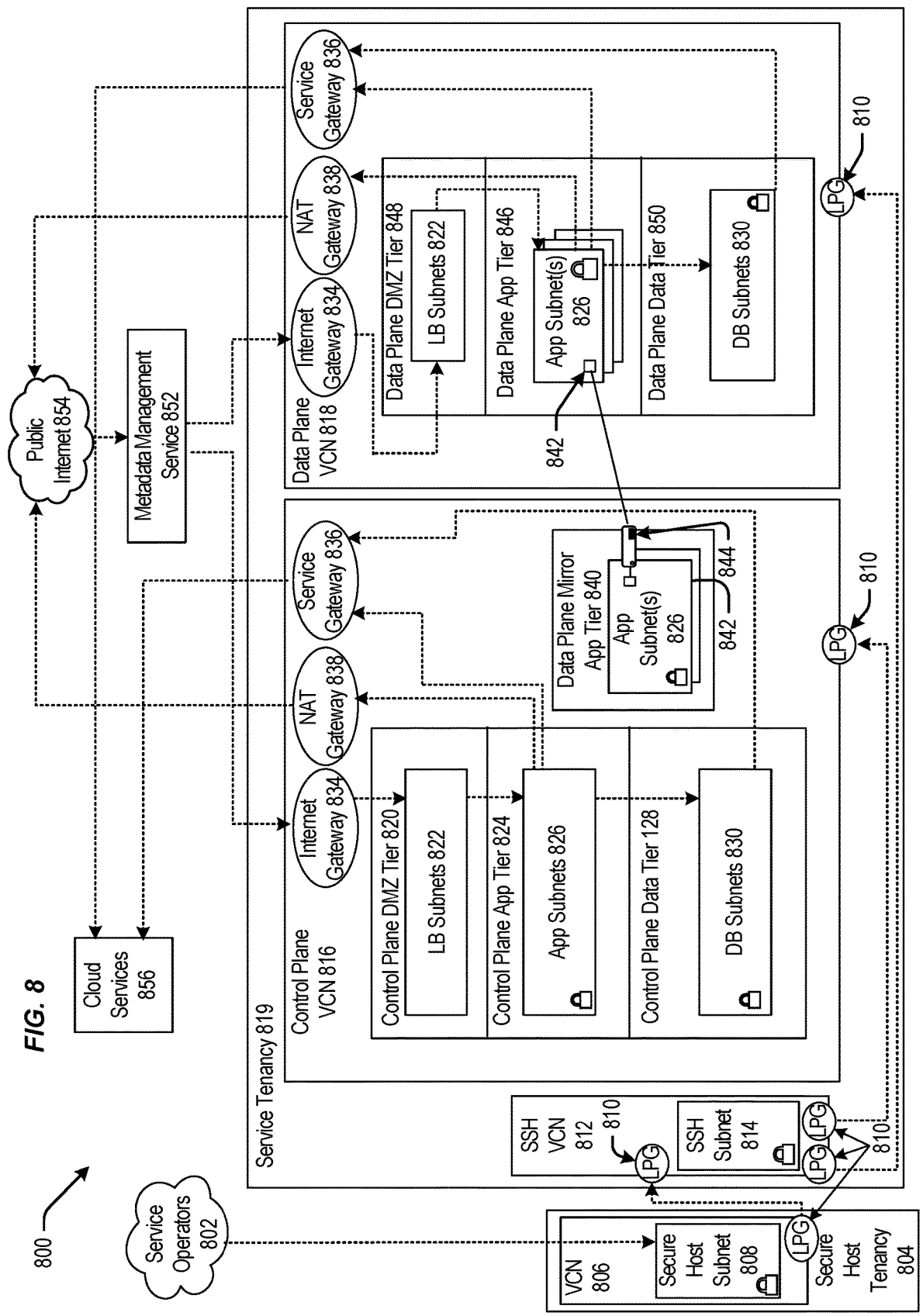
FIG. 8 is a block diagram illustrating one pattern for implementing a cloud infrastructure as a service system, according to at least one embodiment.

FIG. 8 is a block diagram 800 illustrating an example pattern of an IaaS architecture, according to at least one embodiment. Service operators 802 can be communicatively coupled to a secure host tenancy 804 that can include a virtual cloud network (VCN) 806 and a secure host subnet 808. In some examples, the service operators 802 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 806 and/or the Internet.

The VCN 806 can include a local peering gateway (LPG) 810 that can be communicatively coupled to a secure shell (SSH) VCN 812 via an LPG 810 contained in the SSH VCN 812. The SSH VCN 812 can include an SSH subnet 814, and the SSH VCN 812 can be communicatively coupled to a control plane VCN 816 via the LPG 810 contained in the control plane VCN 816. Also, the SSH VCN 812 can be communicatively coupled to a data plane VCN 818 via an LPG 810. The control plane VCN 816 and the data plane VCN 818 can be contained in a service tenancy 819 that can be owned and/or operated by the IaaS provider.

The control plane VCN 816 can include a control plane demilitarized zone (DMZ) tier 820 that acts as a perimeter network (e.g., portions of a corporate network between the corporate intranet and external networks). The DMZ-based servers may have restricted responsibilities and help keep breaches contained. Additionally, the DMZ tier 820 can include one or more load balancer (LB) subnet(s) 822, a control plane app tier 824 that can include app subnet(s) 826, a control plane data tier 828 that can include database (DB) subnet(s) 830 (e.g., frontend DB subnet(s) and/or backend DB subnet(s)). The LB subnet(s) 822 contained in the control plane DMZ tier 820 can be communicatively coupled to the app subnet(s) 826 contained in the control plane app tier 824 and an Internet gateway 834 that can be contained in the control plane VCN 816, and the app subnet(s) 826 can be communicatively coupled to the DB subnet(s) 830 contained in the control plane data tier 828 and a service gateway 836 and a network address translation (NAT) gateway 838. The control plane VCN 816 can include the service gateway 836 and the NAT gateway 838.

The control plane VCN 816 can include a data plane mirror app tier 840 that can include app subnet(s) 826. The app subnet(s) 826 contained in the data plane mirror app tier 840 can include a virtual network interface controller (VNIC) 842 that can execute a compute instance 844. The compute instance 844 can communicatively couple the app subnet(s) 826 of the data plane mirror app tier 840 to app subnet(s) 826 that can be contained in a data plane app tier 846.

The data plane VCN 818 can include the data plane app tier 846, a data plane DMZ tier 848, and a data plane data tier 850. The data plane DMZ tier 848 can include LB subnet(s) 822 that can be communicatively coupled to the app subnet(s) 826 of the data plane app tier 846 and the Internet gateway 834 of the data plane VCN 818. The app subnet(s) 826 can be communicatively coupled to the service gateway 836 of the data plane VCN 818 and the NAT gateway 838 of the data plane VCN 818. The data plane data tier 850 can also include the DB subnet(s) 830 that can be communicatively coupled to the app subnet(s) 826 of the data plane app tier 846.

The Internet gateway 834 of the control plane VCN 816 and of the data plane VCN 818 can be communicatively coupled to a metadata management service 852 that can be communicatively coupled to public Internet 854. Public Internet 854 can be communicatively coupled to the NAT gateway 838 of the control plane VCN 816 and of the data plane VCN 818. The service gateway 836 of the control plane VCN 816 and of the data plane VCN 818 can be communicatively couple to cloud services 856.

In some examples, the service gateway 836 of the control plane VCN 816 or of the data plane VCN 818 can make application programming interface (API) calls to cloud services 856 without going through public Internet 854. The API calls to cloud services 856 from the service gateway 836 can be one-way: the service gateway 836 can make API calls to cloud services 856, and cloud services 856 can send requested data to the service gateway 836. But, cloud services 856 may not initiate API calls to the service gateway 836.

In some examples, the secure host tenancy 804 can be directly connected to the service tenancy 819, which may be otherwise isolated. The secure host subnet 808 can communicate with the SSH subnet 814 through an LPG 810 that may enable two-way communication over an otherwise isolated system. Connecting the secure host subnet 808 to the SSH subnet 814 may give the secure host subnet 808 access to other entities within the service tenancy 819.

The control plane VCN 816 may allow users of the service tenancy 819 to set up or otherwise provision desired resources. Desired resources provisioned in the control plane VCN 816 may be deployed or otherwise used in the data plane VCN 818. In some examples, the control plane VCN 816 can be isolated from the data plane VCN 818, and the data plane mirror app tier 840 of the control plane VCN 816 can communicate with the data plane app tier 846 of the data plane VCN 818 via VNICs 842 that can be contained in the data plane mirror app tier 840 and the data plane app tier 846.

In some examples, users of the system, or customers, can make requests, for example create, read, update, or delete (CRUD) operations, through public Internet 854 that can communicate the requests to the metadata management service 852. The metadata management service 852 can communicate the request to the control plane VCN 816 through the Internet gateway 834. The request can be received by the LB subnet(s) 822 contained in the control plane DMZ tier 820. The LB subnet(s) 822 may determine that the request is valid, and in response to this determination, the LB subnet(s) 822 can transmit the request to app subnet(s) 826 contained in the control plane app tier 824. If the request is validated and requires a call to public Internet 854, the call to public Internet 854 may be transmitted to the NAT gateway 838 that can make the call to public Internet 854. Memory that may be desired to be stored by the request can be stored in the DB subnet(s) 830.

In some examples, the data plane mirror app tier 840 can facilitate direct communication between the control plane VCN 816 and the data plane VCN 818. For example, changes, updates, or other suitable modifications to configuration may be desired to be applied to the resources contained in the data plane VCN 818. Via a VNIC 842, the control plane VCN 816 can directly communicate with, and can thereby execute the changes, updates, or other suitable modifications to configuration to, resources contained in the data plane VCN 818.

In some embodiments, the control plane VCN 816 and the data plane VCN 818 can be contained in the service tenancy 819. In this case, the user, or the customer, of the system may not own or operate either the control plane VCN 816 or the data plane VCN 818. Instead, the IaaS provider may own or operate the control plane VCN 816 and the data plane VCN 818, both of which may be contained in the service tenancy 819. This embodiment can enable isolation of networks that may prevent users or customers from interacting with other users', or other customers', resources. Also, this embodiment may allow users or customers of the system to store databases privately without needing to rely on public Internet 854, which may not have a desired level of threat prevention, for storage.

In other embodiments, the LB subnet(s) 822 contained in the control plane VCN 816 can be configured to receive a signal from the service gateway 836. In this embodiment, the control plane VCN 816 and the data plane VCN 818 may be configured to be called by a customer of the IaaS provider without calling public Internet 854. Customers of the IaaS provider may desire this embodiment since database(s) that the customers use may be controlled by the IaaS provider and may be stored on the service tenancy 819, which may be isolated from public Internet 854.

Figure 9:
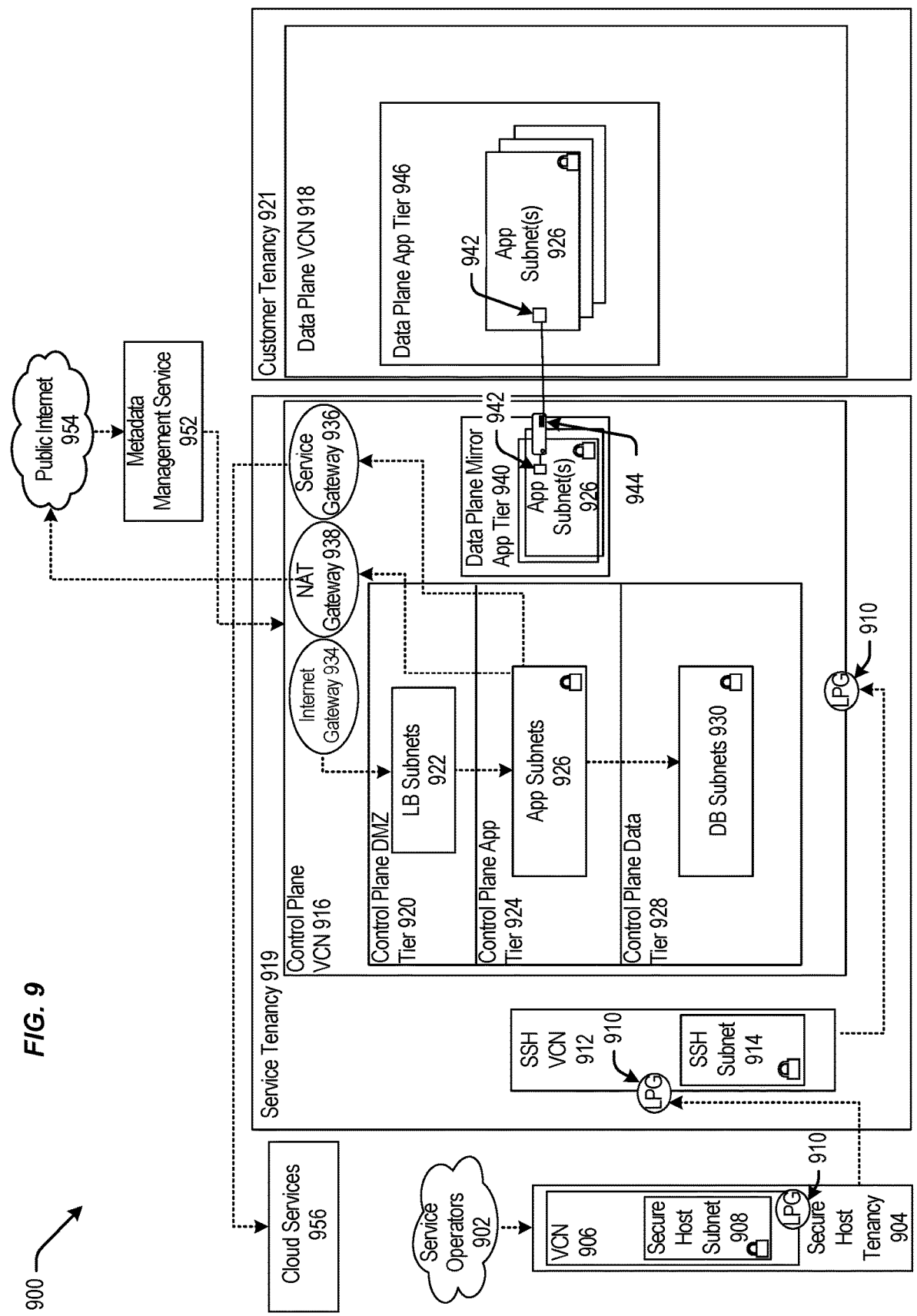
FIG. 9 is a block diagram illustrating another pattern for implementing a cloud infrastructure as a service system, according to at least one embodiment.

FIG. 9 is a block diagram 900 illustrating another example pattern of an IaaS architecture, according to at least one embodiment. Service operators 902 (e.g. service operators 802 of FIG. 8) can be communicatively coupled to a secure host tenancy 904 (e.g. the secure host tenancy 804 of FIG. 8) that can include a virtual cloud network (VCN) 906 (e.g. the VCN 806 of FIG. 8) and a secure host subnet 908 (e.g. the secure host subnet 808 of FIG. 8). The VCN 906 can include a local peering gateway (LPG) 910 (e.g. the LPG 810 of FIG. 8) that can be communicatively coupled to a secure shell (SSH) VCN 912 (e.g. the SSH VCN 812 of FIG. 8) via an LPG 810 contained in the SSH VCN 912. The SSH VCN 912 can include an SSH subnet 914 (e.g. the SSH subnet 814 of FIG. 8), and the SSH VCN 912 can be communicatively coupled to a control plane VCN 916 (e.g. the control plane VCN 816 of FIG. 8) via an LPG 910 contained in the control plane VCN 916. The control plane VCN 916 can be contained in a service tenancy 919 (e.g. the service tenancy 819 of FIG. 8), and the data plane VCN 918 (e.g. the data plane VCN 818 of FIG. 8) can be contained in a customer tenancy 921 that may be owned or operated by users, or customers, of the system.

The control plane VCN 916 can include a control plane DMZ tier 920 (e.g. the control plane DMZ tier 820 of FIG. 8) that can include LB subnet(s) 922 (e.g. LB subnet(s) 822 of FIG. 8), a control plane app tier 924 (e.g. the control plane app tier 824 of FIG. 8) that can include app subnet(s) 926 (e.g. app subnet(s) 826 of FIG. 8), a control plane data tier 928 (e.g. the control plane data tier 828 of FIG. 8) that can include database (DB) subnet(s) 930 (e.g. similar to DB subnet(s) 830 of FIG. 8). The LB subnet(s) 922 contained in the control plane DMZ tier 920 can be communicatively coupled to the app subnet(s) 926 contained in the control plane app tier 924 and an Internet gateway 934 (e.g. the Internet gateway 834 of FIG. 8) that can be contained in the control plane VCN 916, and the app subnet(s) 926 can be communicatively coupled to the DB subnet(s) 930 contained in the control plane data tier 928 and a service gateway 936 (e.g. the service gateway of FIG. 8) and a network address translation (NAT) gateway 938 (e.g. the NAT gateway 838 of FIG. 8). The control plane VCN 916 can include the service gateway 936 and the NAT gateway 938.

The control plane VCN 916 can include a data plane mirror app tier 940 (e.g. the data plane mirror app tier 840 of FIG. 8) that can include app subnet(s) 926. The app subnet(s) 926 contained in the data plane mirror app tier 940 can include a virtual network interface controller (VNIC) 942 (e.g. the VNIC of 842) that can execute a compute instance 944 (e.g. similar to the compute instance 844 of FIG. 8). The compute instance 944 can facilitate communication between the app subnet(s) 926 of the data plane mirror app tier 940 and the app subnet(s) 926 that can be contained in a data plane app tier 946 (e.g. the data plane app tier 846 of FIG. 8) via the VNIC 942 contained in the data plane mirror app tier 940 and the VNIC 942 contained in the data plane app tier 946.

The Internet gateway 934 contained in the control plane VCN 916 can be communicatively coupled to a metadata management service 952 (e.g. the metadata management service 852 of FIG. 8) that can be communicatively coupled to public Internet 954 (e.g. public Internet 854 of FIG. 8). Public Internet 954 can be communicatively coupled to the NAT gateway 938 contained in the control plane VCN 916. The service gateway 936 contained in the control plane VCN 916 can be communicatively couple to cloud services 956 (e.g. cloud services 856 of FIG. 8).

In some examples, the data plane VCN 918 can be contained in the customer tenancy 921. In this case, the IaaS provider may provide the control plane VCN 916 for each customer, and the IaaS provider may, for each customer, set up a unique compute instance 944 that is contained in the service tenancy 919. Each compute instance 944 may allow communication between the control plane VCN 916, contained in the service tenancy 919, and the data plane VCN 918 that is contained in the customer tenancy 921. The compute instance 944 may allow resources, that are provisioned in the control plane VCN 916 that is contained in the service tenancy 919, to be deployed or otherwise used in the data plane VCN 918 that is contained in the customer tenancy 921.

In other examples, the customer of the IaaS provider may have databases that live in the customer tenancy 921. In this example, the control plane VCN 916 can include the data plane mirror app tier 940 that can include app subnet(s) 926. The data plane mirror app tier 940 can reside in the data plane VCN 918, but the data plane mirror app tier 940 may not live in the data plane VCN 918. That is, the data plane mirror app tier 940 may have access to the customer tenancy 921, but the data plane mirror app tier 940 may not exist in the data plane VCN 918 or be owned or operated by the customer of the IaaS provider. The data plane mirror app tier 940 may be configured to make calls to the data plane VCN 918 but may not be configured to make calls to any entity contained in the control plane VCN 916. The customer may desire to deploy or otherwise use resources in the data plane VCN 918 that are provisioned in the control plane VCN 916, and the data plane mirror app tier 940 can facilitate the desired deployment, or other usage of resources, of the customer.

In some embodiments, the customer of the IaaS provider can apply filters to the data plane VCN 918. In this embodiment, the customer can determine what the data plane VCN 918 can access, and the customer may restrict access to public Internet 954 from the data plane VCN 918. The IaaS provider may not be able to apply filters or otherwise control access of the data plane VCN 918 to any outside networks or databases. Applying filters and controls by the customer onto the data plane VCN 918, contained in the customer tenancy 921, can help isolate the data plane VCN 918 from other customers and from public Internet 954.

In some embodiments, cloud services 956 can be called by the service gateway 936 to access services that may not exist on public Internet 954, on the control plane VCN 916, or on the data plane VCN 918. The connection between cloud services 956 and the control plane VCN 916 or the data plane VCN 918 may not be live or continuous. Cloud services 956 may exist on a different network owned or operated by the IaaS provider. Cloud services 956 may be configured to receive calls from the service gateway 936 and may be configured to not receive calls from public Internet 954. Some cloud services 956 may be isolated from other cloud services 956, and the control plane VCN 916 may be isolated from cloud services 956 that may not be in the same region as the control plane VCN 916. For example, the control plane VCN 916 may be located in "Region 1," and cloud service "Deployment 8," may be located in Region 1 and in "Region 2." If a call to Deployment 8 is made by the service gateway 936 contained in the control plane VCN 916 located in Region 1, the call may be transmitted to Deployment 8 in Region 1. In this example, the control plane VCN 916, or Deployment 8 in Region 1, may not be communicatively coupled to, or otherwise in communication with, Deployment 8 in Region 2.

Figure 10:
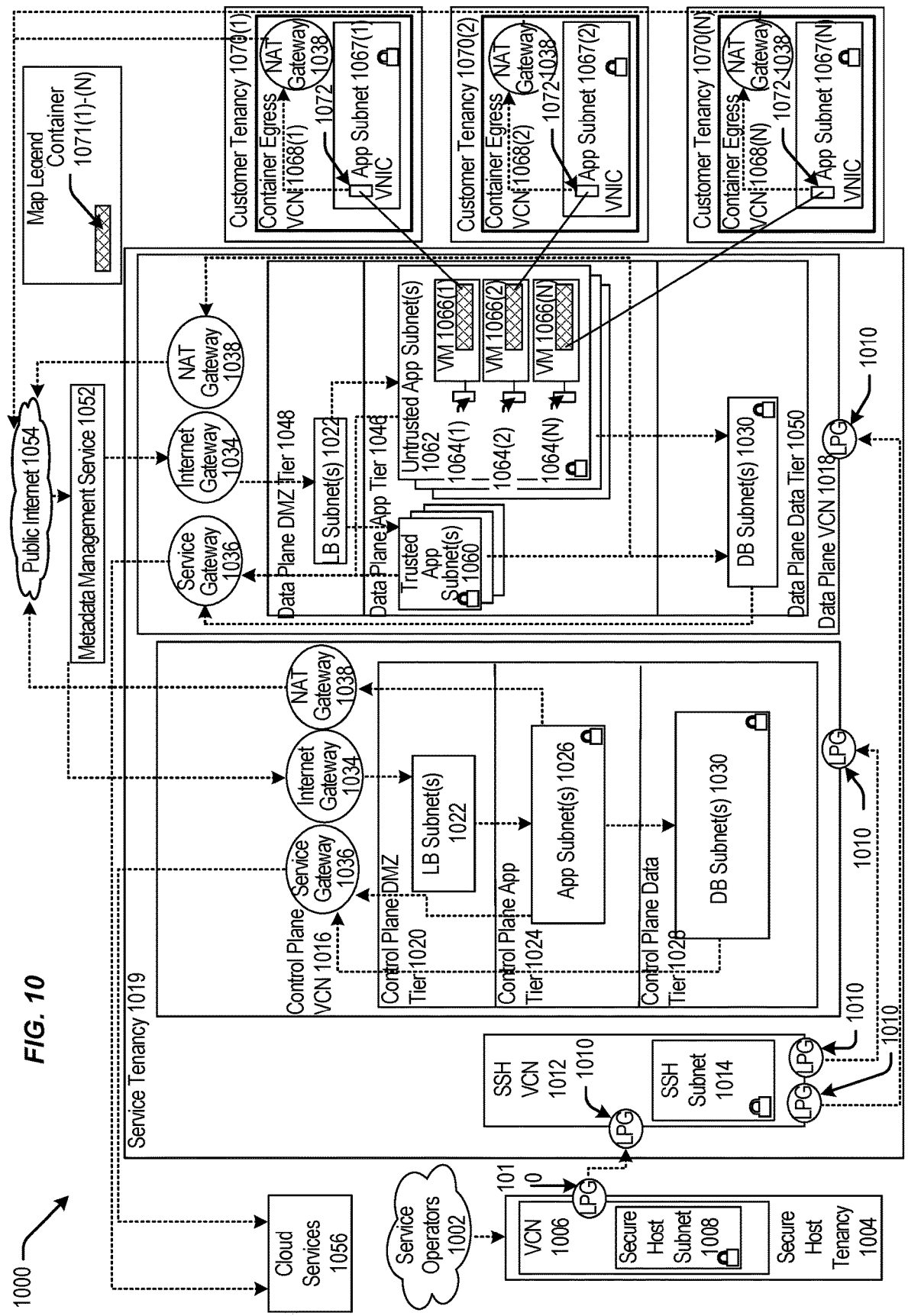
FIG. 10 is a block diagram illustrating another pattern for implementing a cloud infrastructure as a service system, according to at least one embodiment.

FIG. 10 is a block diagram 1000 illustrating another example pattern of an IaaS architecture, according to at least one embodiment. Service operators 1002 (e.g. service operators 802 of FIG. 8) can be communicatively coupled to a secure host tenancy 1004 (e.g. the secure host tenancy 804 of FIG. 8) that can include a virtual cloud network (VCN) 1006 (e.g. the VCN 806 of FIG. 8) and a secure host subnet 1008 (e.g. the secure host subnet 808 of FIG. 8). The VCN 1006 can include an LPG 1010 (e.g. the LPG 810 of FIG. 8) that can be communicatively coupled to an SSH VCN 1012 (e.g. the SSH VCN 812 of FIG. 8) via an LPG 1010 contained in the SSH VCN 1012. The SSH VCN 1012 can include an SSH subnet 1014 (e.g. the SSH subnet 814 of FIG. 8), and the SSH VCN 1012 can be communicatively coupled to a control plane VCN 1016 (e.g. the control plane VCN 816 of FIG. 8) via an LPG 1010 contained in the control plane VCN 1016 and to a data plane VCN 1018 (e.g. the data plane 818 of FIG. 8) via an LPG 1010 contained in the data plane VCN 1018. The control plane VCN 1016 and the data plane VCN 1018 can be contained in a service tenancy 1019 (e.g. the service tenancy 819 of FIG. 8).

The control plane VCN 1016 can include a control plane DMZ tier 1020 (e.g. the control plane DMZ tier 820 of FIG. 8) that can include load balancer (LB) subnet(s) 1022 (e.g. LB subnet(s) 822 of FIG. 8), a control plane app tier 1024 (e.g. the control plane app tier 824 of FIG. 8) that can include app subnet(s) 1026 (e.g. similar to app subnet(s) 826 of FIG. 8), a control plane data tier 1028 (e.g. the control plane data tier 828 of FIG. 8) that can include DB subnet(s) 1030. The LB subnet(s) 1022 contained in the control plane DMZ tier 1020 can be communicatively coupled to the app subnet(s) 1026 contained in the control plane app tier 1024 and to an Internet gateway 1034 (e.g. the Internet gateway 834 of FIG. 8) that can be contained in the control plane VCN 1016, and the app subnet(s) 1026 can be communicatively coupled to the DB subnet(s) 1030 contained in the control plane data tier 1028 and to a service gateway 1036 (e.g. the service gateway of FIG. 8) and a network address translation (NAT) gateway 1038 (e.g. the NAT gateway 838 of FIG. 8). The control plane VCN 1016 can include the service gateway 1036 and the NAT gateway 1038.

The data plane VCN 1018 can include a data plane app tier 1046 (e.g. the data plane app tier 846 of FIG. 8), a data plane DMZ tier 1048 (e.g. the data plane DMZ tier 848 of FIG. 8), and a data plane data tier 1050 (e.g. the data plane data tier 850 of FIG. 8). The data plane DMZ tier 1048 can include LB subnet(s) 1022 that can be communicatively coupled to trusted app subnet(s) 1060 and untrusted app subnet(s) 1062 of the data plane app tier 1046 and the Internet gateway 1034 contained in the data plane VCN 1018. The trusted app subnet(s) 1060 can be communicatively coupled to the service gateway 1036 contained in the data plane VCN 1018, the NAT gateway 1038 contained in the data plane VCN 1018, and DB subnet(s) 1030 contained in the data plane data tier 1050. The untrusted app subnet(s) 1062 can be communicatively coupled to the service gateway 1036 contained in the data plane VCN 1018 and DB subnet(s) 1030 contained in the data plane data tier 1050. The data plane data tier 1050 can include DB subnet(s) 1030 that can be communicatively coupled to the service gateway 1036 contained in the data plane VCN 1018.

The untrusted app subnet(s) 1062 can include one or more primary VNICs 1064(1)-(N) that can be communicatively coupled to tenant virtual machines (VMs) 1066(1)-(N). Each tenant VM 1066(1)-(N) can be communicatively coupled to a respective app subnet 1067(1)-(N) that can be contained in respective container egress VCNs 1068(1)-(N) that can be contained in respective customer tenancies 1070(1)-(N). Respective secondary VNICs 1072(1)-(N) can facilitate communication between the untrusted app subnet(s) 1062 contained in the data plane VCN 1018 and the app subnet contained in the container egress VCNs 1068(1)-(N). Each container egress VCNs 1068(1)-(N) can include a NAT gateway 1038 that can be communicatively coupled to public Internet 1054 (e.g. public Internet 854 of FIG. 8).

The Internet gateway 1034 contained in the control plane VCN 1016 and contained in the data plane VCN 1018 can be communicatively coupled to a metadata management service 1052 (e.g. the metadata management system 852 of FIG. 8) that can be communicatively coupled to public Internet 1054. Public Internet 1054 can be communicatively coupled to the NAT gateway 1038 contained in the control plane VCN 1016 and contained in the data plane VCN 1018. The service gateway 1036 contained in the control plane VCN 1016 and contained in the data plane VCN 1018 can be communicatively couple to cloud services 1056.

In some embodiments, the data plane VCN 1018 can be integrated with customer tenancies 1070. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane tier app 1046. Code to run the function may be executed in the VMs 1066(1)-(N), and the code may not be configured to run anywhere else on the data plane VCN 1018. Each VM 1066(1)-(N) may be connected to one customer tenancy 1070. Respective containers 1071(1)-(N) contained in the VMs 1066(1)-(N) may be configured to run the code. In this case, there can be a dual isolation (e.g., the containers 1071(1)-(N) running code, where the containers 1071(1)-(N) may be contained in at least the VM 1066(1)-(N) that are contained in the untrusted app subnet(s) 1062), which may help prevent incorrect or otherwise undesirable code from damaging the network of the IaaS provider or from damaging a network of a different customer. The containers 1071 (1)-(N) may be communicatively coupled to the customer tenancy 1070 and may be configured to transmit or receive data from the customer tenancy 1070. The containers 1071 (1)-(N) may not be configured to transmit or receive data from any other entity in the data plane VCN 1018. Upon completion of running the code, the IaaS provider may kill or otherwise dispose of the containers 1071(1)-(N).

In some embodiments, the trusted app subnet(s) 1060 may run code that may be owned or operated by the IaaS provider. In this embodiment, the trusted app subnet(s) 1060 may be communicatively coupled to the DB subnet(s) 1030 and be configured to execute CRUD operations in the DB subnet(s) 1030. The untrusted app subnet(s) 1062 may be communicatively coupled to the DB subnet(s) 1030, but in this embodiment, the untrusted app subnet(s) may be configured to execute read operations in the DB subnet(s) 1030. The containers 1071(1)-(N) that can be contained in the VM 1066(1)-(N) of each customer and that may run code from the customer may not be communicatively coupled with the DB subnet(s) 1030.

In other embodiments, the control plane VCN 1016 and the data plane VCN 1018 may not be directly communicatively coupled. In this embodiment, there may be no direct communication between the control plane VCN 1016 and the data plane VCN 1018. However, communication can occur indirectly through at least one method. An LPG 1010 may be established by the IaaS provider that can facilitate communication between the control plane VCN 1016 and the data plane VCN 1018. In another example, the control plane VCN 1016 or the data plane VCN 1018 can make a call to cloud services 1056 via the service gateway 1036. For example, a call to cloud services 1056 from the control plane VCN 1016 can include a request for a service that can communicate with the data plane VCN 1018.

Figure 11:
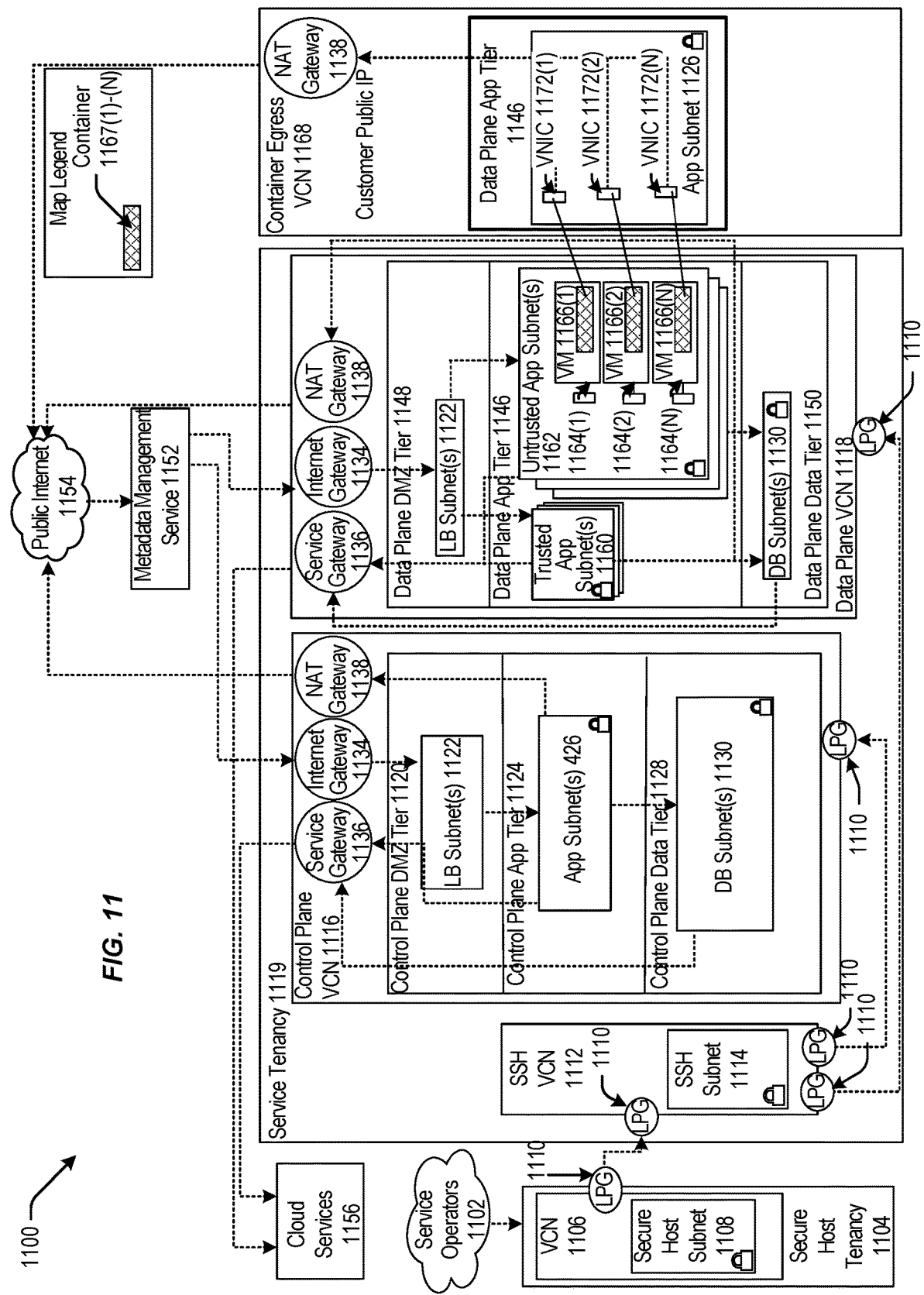
FIG. 11 is a block diagram illustrating another pattern for implementing a cloud infrastructure as a service system, according to at least one embodiment.

FIG. 11 is a block diagram 1100 illustrating another example pattern of an IaaS architecture, according to at least one embodiment. Service operators 1102 (e.g. service operators 802 of FIG. 8) can be communicatively coupled to a secure host tenancy 1104 (e.g. the secure host tenancy 804 of FIG. 8) that can include a virtual cloud network (VCN) 1106 (e.g. the VCN 806 of FIG. 8) and a secure host subnet 1108 (e.g. the secure host subnet 808 of FIG. 8). The VCN 1106 can include an LPG 1110 (e.g. the LPG 810 of FIG. 8) that can be communicatively coupled to an SSH VCN 1112 (e.g. the SSH VCN 812 of FIG. 8) via an LPG 1110 contained in the SSH VCN 1112. The SSH VCN 1112 can include an SSH subnet 1114 (e.g. the SSH subnet 814 of FIG. 8), and the SSH VCN 1112 can be communicatively coupled to a control plane VCN 1116 (e.g. the control plane VCN 816 of FIG. 8) via an LPG 1110 contained in the control plane VCN 1116 and to a data plane VCN 1118 (e.g. the data plane 818 of FIG. 8) via an LPG 1110 contained in the data plane VCN 1118. The control plane VCN 1116 and the data plane VCN 1118 can be contained in a service tenancy 1119 (e.g. the service tenancy 819 of FIG. 8).

The control plane VCN 1116 can include a control plane DMZ tier 1120 (e.g. the control plane DMZ tier 820 of FIG. 8) that can include LB subnet(s) 1122 (e.g. LB subnet(s) 822 of FIG. 8), a control plane app tier 1124 (e.g. the control plane app tier 824 of FIG. 8) that can include app subnet(s) 1126 (e.g. app subnet(s) 826 of FIG. 8), a control plane data tier 1128 (e.g. the control plane data tier 828 of FIG. 8) that can include DB subnet(s) 1130 (e.g. DB subnet(s) 1030 of FIG. 10). The LB subnet(s) 1122 contained in the control plane DMZ tier 1120 can be communicatively coupled to the app subnet(s) 1126 contained in the control plane app tier 1124 and to an Internet gateway 1134 (e.g. the Internet gateway 834 of FIG. 8) that can be contained in the control plane VCN 1116, and the app subnet(s) 1126 can be communicatively coupled to the DB subnet(s) 1130 contained in the control plane data tier 1128 and to a service gateway 1136 (e.g. the service gateway of FIG. 8) and a network address translation (NAT) gateway 1138 (e.g. the NAT gateway 838 of FIG. 8). The control plane VCN 1116 can include the service gateway 1136 and the NAT gateway 1138.

The data plane VCN 1118 can include a data plane app tier 1146 (e.g. the data plane app tier 846 of FIG. 8), a data plane DMZ tier 1148 (e.g. the data plane DMZ tier 848 of FIG. 8), and a data plane data tier 1150 (e.g. the data plane data tier 850 of FIG. 8). The data plane DMZ tier 1148 can include LB subnet(s) 1122 that can be communicatively coupled to trusted app subnet(s) 1160 (e.g. trusted app subnet(s) 1060 of FIG. 10) and untrusted app subnet(s) 1162 (e.g. untrusted app subnet(s) 1062 of FIG. 10) of the data plane app tier 1146 and the Internet gateway 1134 contained in the data plane VCN 1118. The trusted app subnet(s) 1160 can be communicatively coupled to the service gateway 1136 contained in the data plane VCN 1118, the NAT gateway 1138 contained in the data plane VCN 1118, and DB subnet(s)

1130 contained in the data plane data tier 1150. The untrusted app subnet(s) 1162 can be communicatively coupled to the service gateway 1136 contained in the data plane VCN 1118 and DB subnet(s) 1130 contained in the data plane data tier 1150. The data plane data tier 1150 can include DB subnet(s) 1130 that can be communicatively coupled to the service gateway 1136 contained in the data plane VCN 1118.

The untrusted app subnet(s) 1162 can include primary VNICs 1164(1)-(N) that can be communicatively coupled to tenant virtual machines (VMs) 1166(1)-(N) residing within the untrusted app subnet(s) 1162. Each tenant VM 1166(1)-(N) can run code in a respective container 1167(1)-(N), and be communicatively coupled to an app subnet 1126 that can be contained in a data plane app tier 1146 that can be contained in a container egress VCN 1168. Respective secondary VNICs 1172(1)-(N) can facilitate communication between the untrusted app subnet(s) 1162 contained in the data plane VCN 1118 and the app subnet contained in the container egress VCN 1168. The container egress VCN can include a NAT gateway 1138 that can be communicatively coupled to public Internet 1154 (e.g. public Internet 854 of FIG. 8).

The Internet gateway 1134 contained in the control plane VCN 1116 and contained in the data plane VCN 1118 can be communicatively coupled to a metadata management service 1152 (e.g. the metadata management system 852 of FIG. 8) that can be communicatively coupled to public Internet 1154. Public Internet 1154 can be communicatively coupled to the NAT gateway 1138 contained in the control plane VCN 1116 and contained in the data plane VCN 1118. The service gateway 1136 contained in the control plane VCN 1116 and contained in the data plane VCN 1118 can be communicatively couple to cloud services 1156.

In some examples, the pattern illustrated by the architecture of block diagram 1100 of FIG. 11 may be considered an exception to the pattern illustrated by the architecture of block diagram 1000 of FIG. 10 and may be desirable for a customer of the IaaS provider if the IaaS provider cannot directly communicate with the customer (e.g., a disconnected region). The respective containers 1167(1)-(N) that are contained in the VMs 1166(1)-(N) for each customer can be accessed in real-time by the customer. The containers 1167(1)-(N) may be configured to make calls to respective secondary VNICs 1172(1)-(N) contained in app subnet(s) 1126 of the data plane app tier 1146 that can be contained in the container egress VCN 1168. The secondary VNICs 1172(1)-(N) can transmit the calls to the NAT gateway 1138 that may transmit the calls to public Internet 1154. In this example, the containers 1167(1)-(N) that can be accessed in real-time by the customer can be isolated from the control plane VCN 1116 and can be isolated from other entities contained in the data plane VCN 1118. The containers 1167(1)-(N) may also be isolated from resources from other customers.

In other examples, the customer can use the containers 1167(1)-(N) to call cloud services 1156. In this example, the customer may run code in the containers 1167(1)-(N) that requests a service from cloud services 1156. The containers 1167(1)-(N) can transmit this request to the secondary VNICs 1172(1)-(N) that can transmit the request to the NAT gateway that can transmit the request to public Internet 1154. Public Internet 1154 can transmit the request to LB subnet(s) 1122 contained in the control plane VCN 1116 via the Internet gateway 1134. In response to determining the request is valid, the LB subnet(s) can transmit the request to app subnet(s) 1126 that can transmit the request to cloud services 1156 via the service gateway 1136.

It should be appreciated that IaaS architectures 800, 900, 1000, 1100 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 12:
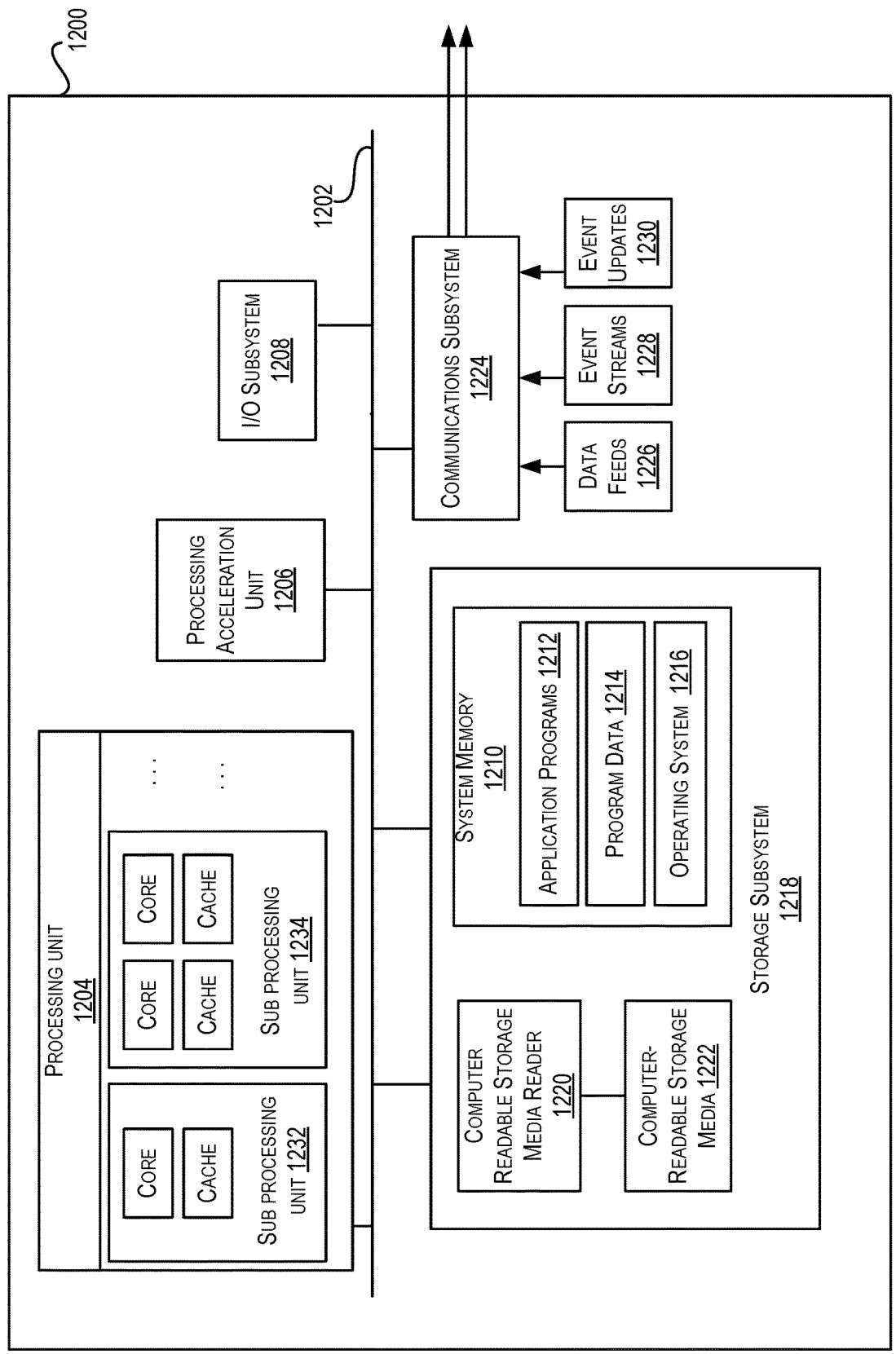
FIG. 12 is a block diagram illustrating an example computer system, according to at least one embodiment.

FIG. 12 illustrates an example computer system 1200, in which various embodiments may be implemented. The system 1200 may be used to implement any of the computer systems described above. As shown in the figure, computer system 1200 includes a processing unit 1204 that communicates with a number of peripheral subsystems via a bus subsystem 1202. These peripheral subsystems may include a processing acceleration unit 1206, an I/O subsystem 1208, a storage subsystem 1218 and a communications subsystem 1224. Storage subsystem 1218 includes tangible computer-readable storage media 1222 and a system memory 1210.

Bus subsystem 1202 provides a mechanism for letting the various components and subsystems of computer system 1200 communicate with each other as intended. Although bus subsystem 1202 is shown schematically as a single bus, alternative embodiments of the bus subsystem may utilize multiple buses. Bus subsystem 1202 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1204, which can be implemented as one or more integrated circuits (e.g., a conventional microprocessor or microcontroller), controls the operation of computer system 1200. One or more processors may be included in processing unit 1204. These processors may include single core or multicore processors. In certain embodiments, processing unit 1204 may be implemented as one or more independent processing units 1232 and/or 1234 with single or multicore processors included in each processing unit. In other embodiments, processing unit 1204 may also be implemented as a quad-core processing unit formed by integrating two dual-core processors into a single chip.

In various embodiments, processing unit 1204 can execute a variety of programs in response to program code and can maintain multiple concurrently executing programs or processes. At any given time, some or all of the program code to be executed can be resident in processor(s) 1204 and/or in storage subsystem 1218. Through suitable programming, processor(s) 1204 can provide various functionalities described above. Computer system 1200 may additionally include a processing acceleration unit 1206, which can include a digital signal processor (DSP), a special-purpose processor, and/or the like.

I/O subsystem 1208 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1200 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1200 may comprise a storage subsystem 1218 that comprises software elements, shown as being currently located within a system memory 1210. System memory 1210 may store program instructions that are loadable and executable on processing unit 1204, as well as data generated during the execution of these programs.

Depending on the configuration and type of computer system 1200, system memory 1210 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1204. In some implementations, system memory 1210 may include multiple different types of memory, such as static random access memory (SRAM) or dynamic random access memory (DRAM). In some implementations, a basic input/output system (BIOS), containing the basic routines that help to transfer information between elements within computer system 1200, such as during start-up, may typically be stored in the ROM. By way of example, and not limitation, system memory 1210 also illustrates application programs 1212, which may include client applications, Web browsers, mid-tier applications, relational database management systems (RDBMS), etc., program data 1214, and an operating system 1216. By way of example, operating system 1216 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 12 OS, and Palm® OS operating systems.

Storage subsystem 1218 may also provide a tangible computer-readable storage medium for storing the basic programming and data constructs that provide the functionality of some embodiments. Software (programs, code modules, instructions) that when executed by a processor provide the functionality described above may be stored in storage subsystem 1218. These software modules or instructions may be executed by processing unit 1204. Storage subsystem 1218 may also provide a repository for storing data used in accordance with the present disclosure.

Storage subsystem 1200 may also include a computer-readable storage media reader 1220 that can further be connected to computer-readable storage media 1222. Together and, optionally, in combination with system memory 1210, computer-readable storage media 1222 may comprehensively represent remote, local, fixed, and/or removable storage devices plus storage media for temporarily and/or more permanently containing, storing, transmitting, and retrieving computer-readable information.

Computer-readable storage media 1222 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1200.

By way of example, computer-readable storage media 1222 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1222 may include, but is not limited to, Zip® drives, flash memory cards, universal serial bus (USB) flash drives, secure digital (SD) cards, DVD disks, digital video tape, and the like. Computer-readable storage media 1222 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1200.

Communications subsystem 1224 provides an interface to other computer systems and networks. Communications subsystem 1224 serves as an interface for receiving data from and transmitting data to other systems from computer system 1200. For example, communications subsystem 1224 may enable computer system 1200 to connect to one or more devices via the Internet. In some embodiments communications subsystem 1224 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1224 can provide wired network connectivity (e.g., Ethernet) in addition to or instead of a wireless interface.

In some embodiments, communications subsystem 1224 may also receive input communication in the form of structured and/or unstructured data feeds 1226, event streams 1228, event updates 1230, and the like on behalf of one or more users who may use computer system 1200.

By way of example, communications subsystem 1224 may be configured to receive data feeds 1226 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1224 may also be configured to receive data in the form of continuous data streams, which may include event streams 1228 of real-time events and/or event updates 1230, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1224 may also be configured to output the structured and/or unstructured data feeds 1226, event streams 1228, event updates 1230, and the like to one or more databases that may be in communication with one or more streaming data source computers coupled to computer system 1200.

Computer system 1200 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1200 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A computer-implemented method, comprising:
capturing call stack data corresponding to a plurality of cloud-computing resources, the call stack data being captured by a plurality of proxy devices, the plurality of proxy devices being distinct from the cloud-computing resources, each respective proxy device being configured to monitor communications between a respective set of pairs of cloud-computing resources of the plurality of cloud-computing resources, and the set of pairs of cloud-computing resources associated with a particular proxy device being different from the sets of pairs of cloud-computing resources associated with other proxy devices of the plurality of proxy devices;
generating a directional graph comprising a plurality of nodes and a plurality of edges, each of the plurality of nodes representing a respective cloud-computing resource of the plurality of cloud-computing resources, and each edge of the plurality of edges representing a communications path between a respective pair of cloud-computing resources of the plurality of cloud-computing resources through a proxy device of the plurality of proxy devices;
identifying a plurality of ingress communication paths to a cloud-computing resource based at least in part on identifying, from the directional graph, a set of edges of the plurality of edges that end at a particular node of the plurality of nodes that represents the cloud-computing resource;
calculating a plurality of metrics corresponding to each of the plurality of ingress communication paths identified with the set of edges ending at the particular node, the plurality of metrics being calculated based at least in part on the call stack data captured by proxy devices that are configured to monitor communications over the plurality of ingress communication paths;
identifying, based at least in part on the plurality of metrics, that a number of respective failures exist over the plurality of ingress communication paths;
identifying that the number of respective failures identified for the cloud-computing resource exceeds a threshold with respect to a count of the plurality of ingress communication paths to the cloud-computing resource;
responsive to identifying that the number of respective failures exceeds the threshold, identifying that a failure exists at the cloud-computing resource; and
providing a notification indicating existence of the failure.

2. The computer-implemented method of claim 1, further comprising:
identifying that two or more edges of the directional graph collectively define an aggregate path from a first cloud-computing resource to a second cloud-computing resource, the second cloud-computing resource being communicatively connected to the first cloud-computing resource via one or more intervening cloud-computing resources;
calculating a collective latency value based at least in part on a respective latency value corresponding to each edge in the aggregate path;
identifying that the collective latency value exceeds a predefined threshold value; and
identifying the aggregate path as failure based at least in part on identifying that the collective latency value exceeds the corresponding predefined threshold value.

3. The computer-implemented method of claim 1, wherein each instance of the call stack data comprising a source identifier of a first cloud-computing resource of the plurality of cloud-computing resources, a destination identifier for a second cloud-computing resource of the plurality of cloud-computing resources, a request identifier, a latency value, and a response code.

4. The computer-implemented method of claim 1, wherein calculating the plurality of metrics comprises calculating i) a latency value and ii) a success rate value for each of the plurality of ingress communication paths to the cloud-computing resource, the latency value and the success rate value being calculated based at least in part on obtaining corresponding call stack data that corresponds to a time period, the corresponding call stack data being associated with the plurality of ingress communication paths to the cloud-computing resource.

5. The computer-implemented method of claim 1, wherein identifying that the failure exists comprises at least one of:

determining that a latency value corresponding to one or more ingress communications paths of the plurality of ingress communication paths exceeds a latency threshold; or determining that a success rate value corresponding to one or more ingress communications paths of the plurality of ingress communication paths exceeds a success rate threshold.

6. The computer-implemented method of claim 1, wherein the call stack data with which the plurality of metrics corresponding to each of the plurality of ingress communication paths are calculated is selected from a corpus of call stack data based at least in part on identifying the call stack data is associated with a particular time period.

7. A cloud-computing system, comprising:
one or more processors; and
one or more memories storing computer-executable instructions that, when executed with the one or more processors, cause the cloud-computing system to:
capture call stack data corresponding to a plurality of cloud-computing resources, the call stack data being captured by a plurality of proxy devices, the plurality of proxy devices being distinct from the cloud-computing resources, each respective proxy device being configured to monitor communications between a respective set of pairs of cloud-computing resources of the plurality of cloud-computing resources, and the set of pairs of cloud-computing resources associated with a particular proxy device being different from the sets of pairs of cloud-computing resources associated with other proxy devices of the plurality of proxy devices;
generate a directional graph comprising a plurality of nodes and a plurality of edges, representing a respective cloud-computing resource of the plurality of cloud-computing resources, and each edge of the plurality of edges representing a communications path between a respective pair of cloud-computing resources of the plurality of cloud-computing resources through a proxy device of the plurality of proxy devices;
identify a plurality of ingress communication paths to a cloud-computing resource based at least in part on identifying, from the directional graph, a set of edges of the plurality of edges that end at a particular node of the plurality of nodes that represents the cloud-computing resource;
calculate a plurality of metrics corresponding to each of the plurality of ingress communication paths identified with the set of edges ending at the particular node, the plurality of metrics being calculated based at least in part on the call stack data captured by the proxy devices that are configured to monitor communications over the plurality of ingress communication paths;
identify, based at least in part on the plurality of metrics, that a number of respective failures exist over the plurality of ingress communication paths;
identify that the number of respective failures exceeds a threshold with respect to a count of the plurality of ingress communication paths to the cloud-computing resource;
responsive to identifying that the number of respective failures exceeds the threshold, identify that a failure exists at the cloud-computing resource; and
provide a notification indicating existence of the failure.

8. The cloud-computing system of claim 7, wherein executing the instructions further causes the cloud-computing system to:
identify that two or more edges of the directional graph collectively define an aggregate path from a first cloud-computing resource to a second cloud-computing resource, the second cloud-computing resource being communicatively connected to the first cloud-computing resource via one or more intervening cloud-computing resources;
calculate a collective latency value based at least in part on a respective latency value corresponding to each edge in the aggregate path;
identify that the collective latency value exceeds a predefined threshold value; and
identify the aggregate path as a failure based at least in part on identifying that the collective latency value exceeds the corresponding predefined threshold value.

9. The cloud-computing system of claim 7, wherein each instance of the call stack data comprising a source identifier of a first cloud-computing resource of the plurality of cloud-computing resources, a destination identifier for a second cloud-computing resource of the plurality of cloud-computing resources, a request identifier, a latency value, and a response code.

10. The cloud-computing system of claim 7, wherein calculating the plurality of metrics comprises calculating i) a latency value and ii) a success rate value for each of the plurality of ingress communication paths to the cloud-computing resource, the latency value and the success rate value being calculated based at least in part on obtaining corresponding call stack data that corresponds to a time period, the corresponding call stack data being associated with the plurality of ingress communication paths to the cloud-computing resource.

11. The cloud-computing system of claim 7, wherein identifying that the failure exists causes the cloud-computing system to:
determine that a latency value corresponding to one or more ingress communications paths of the plurality of ingress communication paths exceeds a latency threshold; or
determine that a success rate value corresponding to one or more ingress communications paths of the plurality of ingress communication paths exceeds a success rate threshold.

12. The cloud-computing system of claim 7, wherein the call stack data with which the plurality of metrics corresponding to each of the plurality of ingress communication paths are calculated is selected from a corpus of call stack data based at least in part on identifying the call stack data is associated with a particular time period.

13. A non-transitory computer-readable medium comprising executable instructions that, when executed with one or more processors of a cloud-computing system, cause the cloud-computing system to:
capture call stack data corresponding to a plurality of cloud-computing resources, the call stack data being captured by a plurality of proxy devices, the plurality of proxy devices being distinct from the cloud-computing resources, each respective proxy device being configured to monitor communications between a respective set of pairs of cloud-computing resources of the plurality of cloud-computing resources, and the set of pairs of cloud-computing resources associated with a particular proxy device being different from the sets of pairs of cloud-computing resources associated with other proxy devices of the plurality of proxy devices;

generate a directional graph comprising a plurality of nodes and a plurality of edges, each of the plurality of nodes representing a respective cloud-computing resource of the plurality of cloud-computing resources, and each edge of the plurality of edges representing a communications path between a respective pair of cloud-computing resources of the plurality of cloud-computing resources through a proxy device of the plurality of proxy devices;

identify a plurality of ingress communication paths to a cloud-computing resource based at least in part on identifying, from the directional graph, a set of edges of the plurality of edges that end at a particular node of the plurality of nodes that represents the cloud-computing resource;

calculate a plurality of metrics corresponding to each of the plurality of ingress communication paths identified with the set of edges ending at the particular node, the plurality of metrics being calculated based at least in part on the call stack data captured by the proxy devices that are configured to monitor communications over the plurality of ingress communication paths;

identify, based at least in part on the plurality of metrics, that a number of respective failures exist over the plurality of ingress communication paths;

identify that the number of respective failures identified for the cloud-computing resource exceeds a threshold with respect to a count of the plurality of ingress communication paths to the cloud-computing resource;

responsive to identifying that the number of respective failures exceeds the threshold, identify that a failure exists at the cloud-computing resource; and provide a notification indicating existence of the failure.

14. The non-transitory computer-readable medium of claim 13, wherein executing the instructions further causes the cloud-computing system to:

identify that two or more edges of the directional graph collectively define an aggregate path from a first cloud-computing resource to a second cloud-computing resource, the second cloud-computing resource being communicatively connected to the first cloud-computing resource via one or more intervening cloud-computing resources;

calculate a collective latency value based at least in part on a respective latency value corresponding to each edge in the aggregate path;

identify that the collective latency value exceeds a predefined threshold value; and identify the aggregate path as a failure based at least in part on identifying that the collective latency value exceeds the corresponding predefined threshold value.

15. The non-transitory computer-readable medium of claim 13, wherein each instance of the call stack data comprising a source identifier of a first cloud-computing resource of the plurality of cloud-computing resources, a destination identifier for a second cloud-computing resource of the plurality of cloud-computing resources, a request identifier, a latency value, and a response code.

16. The non-transitory computer-readable medium of claim 13, wherein calculating the plurality of metrics comprises calculating i) a latency value and ii) a success rate value for each of the plurality of ingress communication paths to the cloud-computing resource, the latency value and the success rate value being calculated based at least in part on obtaining call stack data from a time period, the call stack data being associated with the plurality of ingress communication paths to the cloud-computing resource.

17. The non-transitory computer-readable medium of claim 13, wherein identifying that the failure exists causes the cloud-computing system to:

determine that a latency value corresponding to one or more ingress communications paths of the plurality of ingress communication paths exceeds a latency threshold; or determine that a success rate value corresponding to one or more ingress communications paths of the plurality of ingress communication paths exceeds a success rate threshold.

* * * * *

UNITED STATES PATENT AND TRADEMARK OFFICE
CERTIFICATE OF CORRECTION

PATENT NO. : 11,563,628 B1
APPLICATION NO. : 17/409679
DATED : January 24, 2023
INVENTOR(S) : Hassan et al.

It is certified that error appears in the above-identified patent and that said Letters Patent is hereby corrected as shown below:

In the Claims

In Column 30, Line 44, in Claim 2, after "as" insert -- a --, therefor.

In Column 31, Line 34, in Claim 7, delete "representing" and insert -- each node of the plurality of nodes representing --, therefor.

Signed and Sealed this
Nineteenth Day of December, 2023

Katherine Kelly Vidal
*Director of the United States Patent and Trademark Office*